(12) United States Patent
Yoshinaga et al.

(10) Patent No.: US 7,672,197 B2
(45) Date of Patent: Mar. 2, 2010

(54) OPTICAL PICKUP DEVICE AND MANUFACTURING METHOD THEREOF

(75) Inventors: Chikashi Yoshinaga, Ota (JP); Sadao Iizuka, Ora-gun (JP); Yasuhide Kogo, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1268 days.

(21) Appl. No.: 11/175,886

(22) Filed: Jul. 6, 2005

(65) Prior Publication Data

US 2006/0007799 A1    Jan. 12, 2006

(30) Foreign Application Priority Data

Jul. 7, 2004    (JP)    ............................. 2004-200787

(51) Int. Cl.
*G11B 7/00*    (2006.01)
(52) U.S. Cl. ................. 369/44.14; 369/44.22; 359/813; 359/819; 359/822
(58) Field of Classification Search ................ 369/44.1, 369/44.22; 359/811–813, 818–822; 310/89
See application file for complete search history.

(56) References Cited

U.S. PATENT DOCUMENTS

| | | | | |
|---|---|---|---|---|
| 4,727,529 | A | * | 2/1988 | Araki et al. ............... 369/44.32 |
| 5,414,563 | A | * | 5/1995 | Tanaka ........................ 359/814 |
| 6,262,853 | B1 | * | 7/2001 | Takanashi et al. ............ 359/703 |
| 6,819,502 | B2 | * | 11/2004 | Nomura et al. .............. 359/701 |
| 7,079,332 | B2 | * | 7/2006 | Tanaka ........................ 359/822 |
| 2004/0042778 | A1 | * | 3/2004 | Nomura ........................ 396/73 |

FOREIGN PATENT DOCUMENTS

| | | |
|---|---|---|
| JP | 5225583 | 3/1993 |
| JP | 11-86296 | 3/1999 |
| JP | 2000315341 | 11/2000 |
| JP | 2000348373 | 12/2000 |
| JP | 2001160229 | 6/2001 |
| JP | 2001344806 | 12/2001 |

OTHER PUBLICATIONS

Machine Translation of Japan Publication No. 11086296 by Fujii Hirotsuyo on Mar. 30, 1999.*
Chinese Office Action, "Notification of First Office Action," State Intellectual Property Office of P.R. China (China), (Oct. 27, 2006).
State Intellectual Property Office of P.R. China, "Notification of Second Office Action", dated Sep. 28, 2007.

\* cited by examiner

*Primary Examiner*—Wayne R Young
*Assistant Examiner*—Linh T Nguyen
(74) *Attorney, Agent, or Firm*—Pillsbury Winthrop Shaw Pittman LLP

(57) ABSTRACT

An optical pickup device having a lens through which light transmits, a holder to which the lens is mounted, a position adjusting member which is mounted on the holder, and a housing to which the holder is mounted has a structure to allow adjustment of a mounting position of a lens assembly formed by mounting the lens and the position adjusting member on the holder when the lens assembly is assembled in the housing. In this manner, the lens can be mounted to the housing with high precision.

6 Claims, 15 Drawing Sheets

OPTICAL PICKUP DEVICE AND MANUFACTURING METHOD THEREOF

CROSS-REFERENCE TO RELATED APPLICATIONS

The entire disclosure of Japanese Patent Application No. 2004-200787 including specification, claims, drawings and abstract is incorporated herein by reference.

BACKGROUND OF THE INVENTION

1. Field of the Invention

The present invention relates to an optical pickup device which can read information on media, and to a manufacturing method of the optical pickup device. The optical pickup device of the present invention is, for example, equipped in an optical disk device.

2. Description of the Related Art

FIG. 14 is an explanatory diagram showing one form of an optical pickup device in the related art.

A current is applied from a laser driver (LDD) 510 to a laser diode (LD) 520 and laser light is output from the LD 520. The laser diode is abbreviated in this description as "LD". The LD 520 is stored in a laser holder (LD holder) 530. Because the laser holder 530 stores LD, the laser holder is abbreviated in this description as "LD holder".

The LDD 510 is a laser driver circuit which drives the LD 520 so that laser light is emitted from the LD 520. When a current is supplied from the LDD 510 to the LD 520, laser light is emitted from the LD 520 and information is recorded on a disk 600 or information recorded on the disk 600 is replayed.

The laser light output from the LD 520 is irradiated onto the disk 600 through a diffraction grating 540, a divergent lens 550, a half mirror 560, and an objective lens 570. The half mirror is abbreviated in this description as "HM" and the objective lens is abbreviated as "OBL".

A portion of laser light reflected from the disk 600 is incident on a photodiode IC 580. The photodiode IC is abbreviated in this description as "PDIC". The PDIC 580 receives light, converts the optical signal into an electrical signal, and operates a servo mechanism (not shown) of a lens holder (not shown) of an optical pickup device 501. A servo mechanism is a mechanism which measures a state of a control target, compares the measured value with a reference value, and applies automatic correction control.

A portion of the laser light output from the LD 520 enters a front monitor diode 590. A portion of the laser light emitted from the LD 520 is detected by a front monitor diode 590 behind the HM 560. The front monitor diode is abbreviated in this description as "FMD". The FMD 590 is used to monitor the laser light output from the LD 520 and apply feedback for control of the LD 520.

The LDD 510, LD 500, PDIC 580, and FMD 590 are connected to a flexible printed circuit 505 in an electrically conductive manner. The flexible printed circuit is abbreviated in this description as "FPC". A plurality of circuit conductors 505p are printed on an insulating sheet 505q. For example, a plurality of metal foils 505p such as copper foil are provided on the insulating sheet 505q and a protection layer (not shown) is provided on the metal foils to form the FPC 505.

A housing (not shown) holds the FPC 505, LDD 510, LD holder 530 having the LD 520, diffraction grating 540, divergent lens 550, HM 560, OBL 570, PDIC 580, and FMD 590. The term "housing" refers to a box in which an object can be held, such as a box-shaped structure in which a component is stored, or a structure similar to a box.

The optical pickup device 501 includes various components as described above. The optical pickup device 501 may include other components (not shown) in addition to those shown in FIG. 14.

Data such as information is replayed from or recorded to a media 600 using the optical pickup device 501. As the media 600, for example, various optical disks may be used such as a read-only optical disk such as a CD-ROM, a write-once optical disk such as a CD-R, and an optical disk which can be written/rewritten such as a CD-RW.

The term "CD" is an abbreviation for Compact Disc. The term "ROM" in "CD-ROM" is an abbreviation for "Read Only Memory". Thus, CD-ROM is for data reading only. The term "R" in "CD-R" is an abbreviation for "Recordable". Data can be written to the CD-R. The term "RW" in "CD-RW" is an abbreviation for "ReWritable". Thus, data can be rewritten on a CD-RW.

The optical pickup device 501 replays data recorded on various optical disks or records data on various writable or rewritable optical disks.

In addition, there are, for example, a light source unit in which an offset of an error signal which is generated because of a variation in intensity distribution of the light source is reduced and an optical head which uses the light source unit.

However, in the optical pickup device 501 of the related art shown in FIG. 14, there is a problem in that when a position of mounting the divergent lens 550 with respect to the housing (not shown) is deviated, setting of an optical path in the optical pickup device is deviated.

For example, when a divergent lens 550 is mounted on the housing, if the divergent lens 550 is mounted at a position which is deviated from a predetermined position of the housing, a problem occurs in the optical pickup device 501 because, for example, the laser light is not properly focused on the objective lens 570 and FMD 590.

SUMMARY OF THE INVENTION

According to one aspect of the present invention, there is provided an optical pickup device comprising a lens through which light transmits, a holder in which the lens is mounted, a position adjusting member which is mounted on the holder, and a housing to which the holder is mounted, wherein a lens assembly is formed by mounting the lens and the position adjusting member on the holder, and the housing has a structure which allows adjustment of a mounting position of the lens assembly when the lens assembly is assembled to the housing.

According to another aspect of the present invention, there is provided a manufacturing method of an optical pickup device wherein a position adjusting member which allows a holder to move is mounted on the holder, a lens assembly is formed by mounting a lens through which light is transmitted on the holder, and the lens assembly is assembled on a housing while allowing adjustment of a mounting position of the lens assembly with respect to the housing using a position adjusting jig.

BRIEF DESCRIPTION OF THE DRAWINGS

A preferred embodiment of the present invention will be described in detail based on the following drawings, wherein.

DESCRIPTION OF PREFERRED EMBODIMENT

Figure 1:
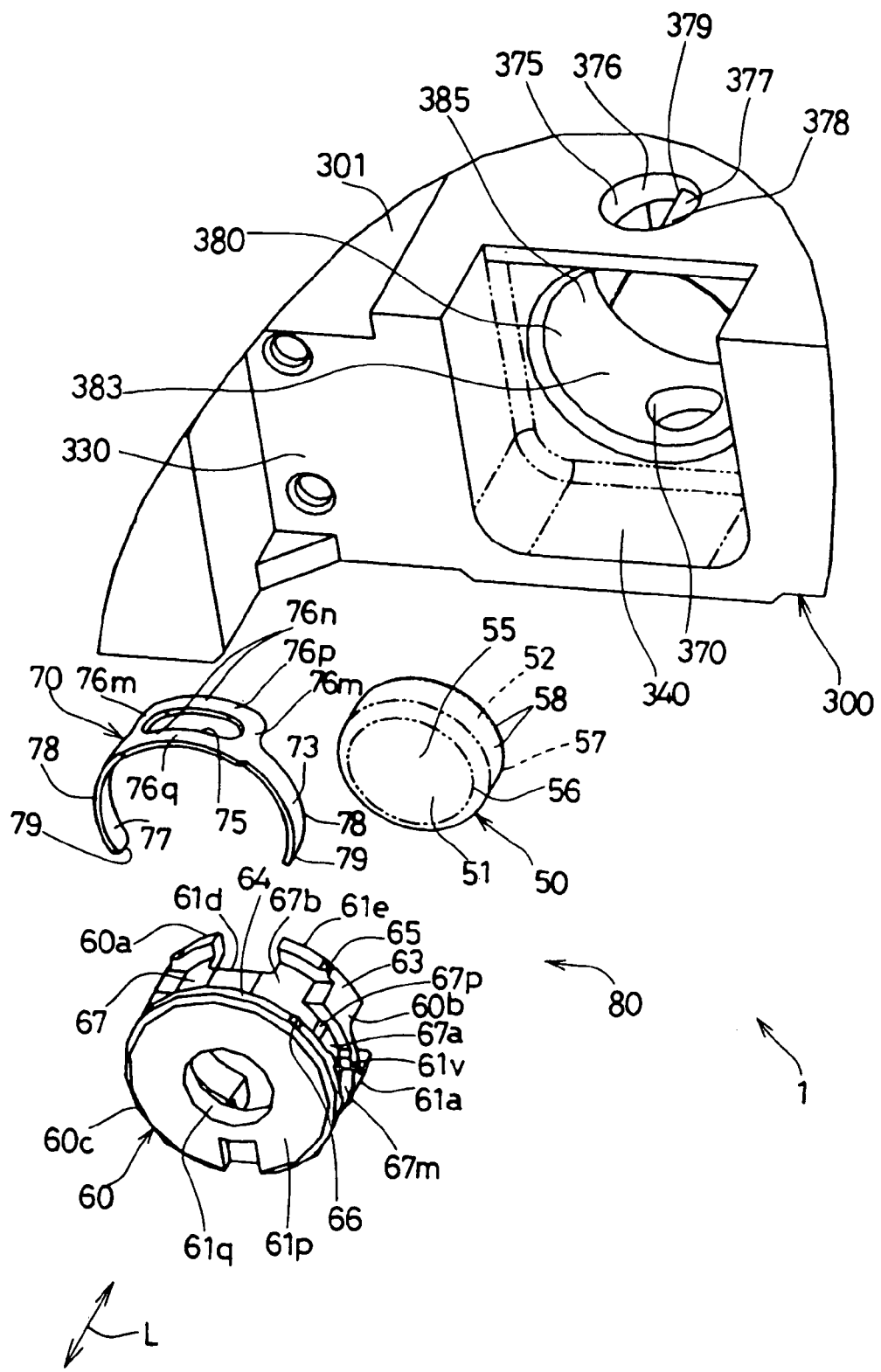
FIG. 1 is an enlarged and exploded perspective view of an optical pickup device and a manufacturing method thereof according to a preferred embodiment of the present invention.

An optical pickup device and a manufacturing method thereof according to a preferred embodiment (hereinafter simply referred to as "embodiment") of the present invention will now be described in detail referring to the drawings.

Figure 2:
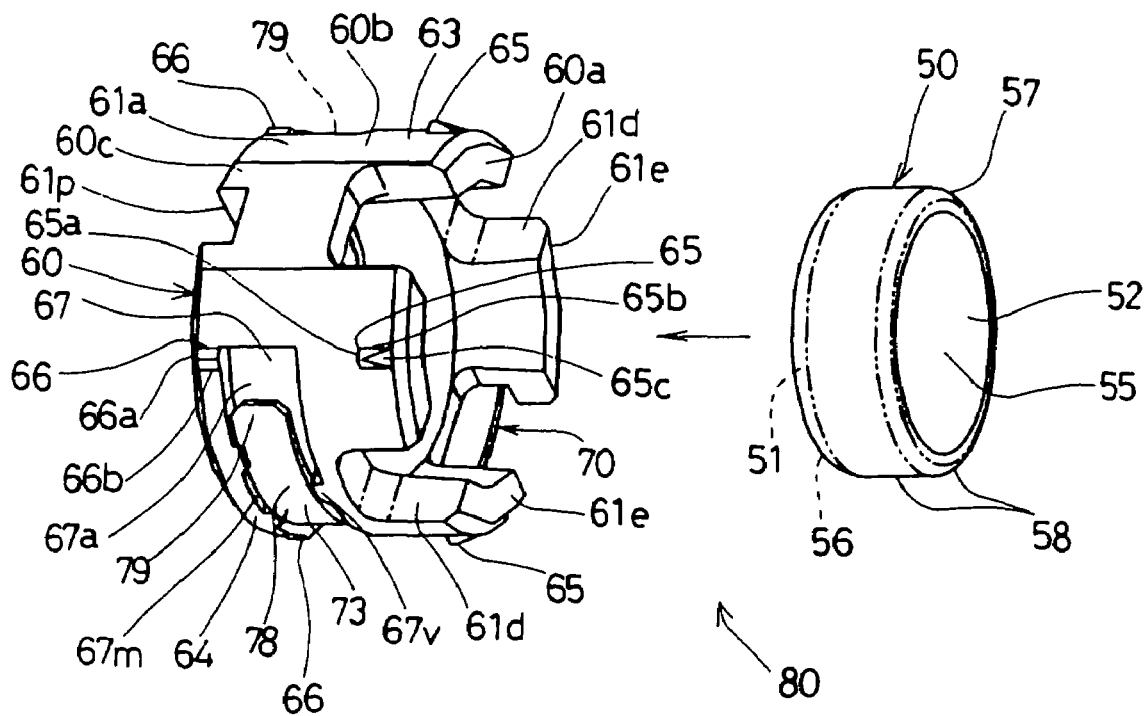
FIG. 2 is an exploded perspective view showing a state in which a lens assembly is formed by mounting a lens on a holder having a position adjusting member.
Figure 3:
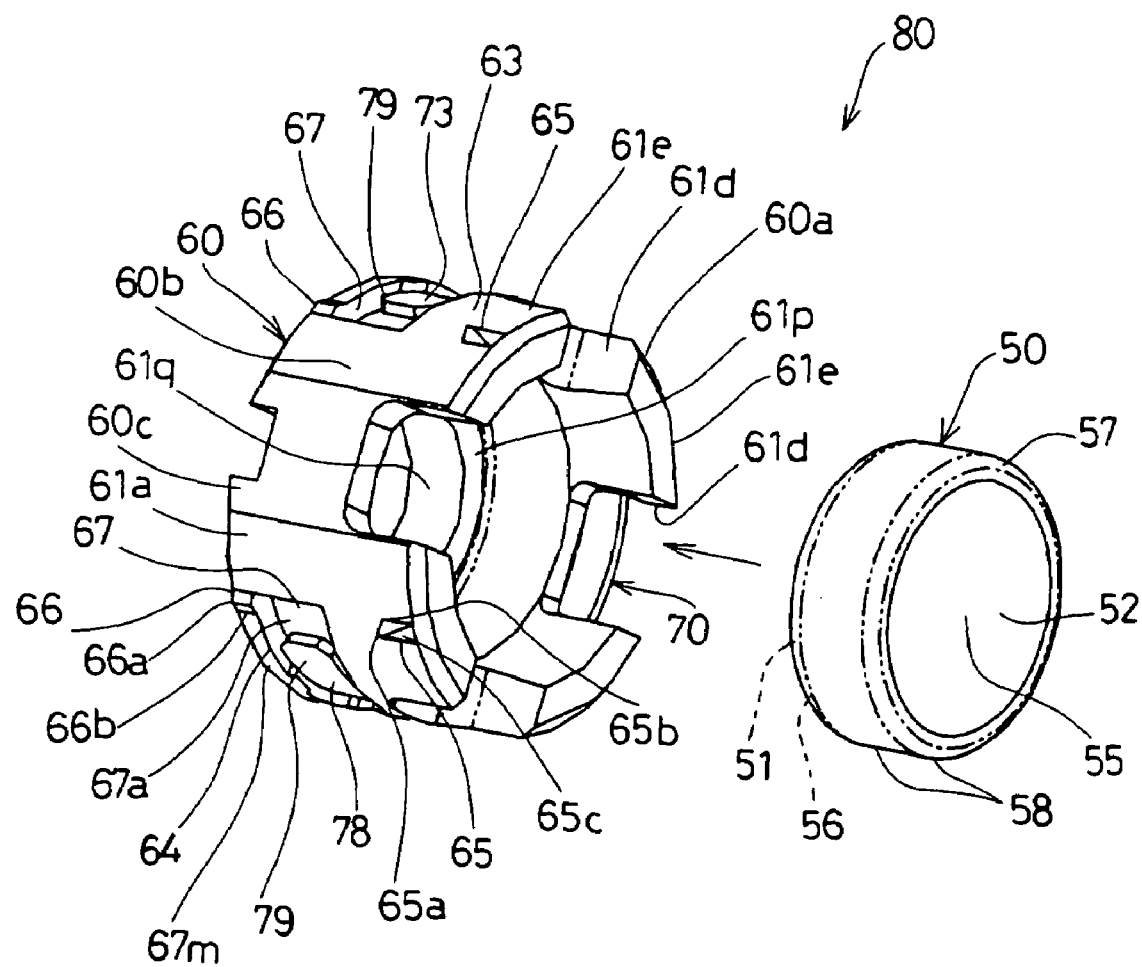
FIG. 3 is an exploded perspective view showing a state in which a lens assembly is formed by mounting a lens on a holder having a position adjusting member.
Figure 4:
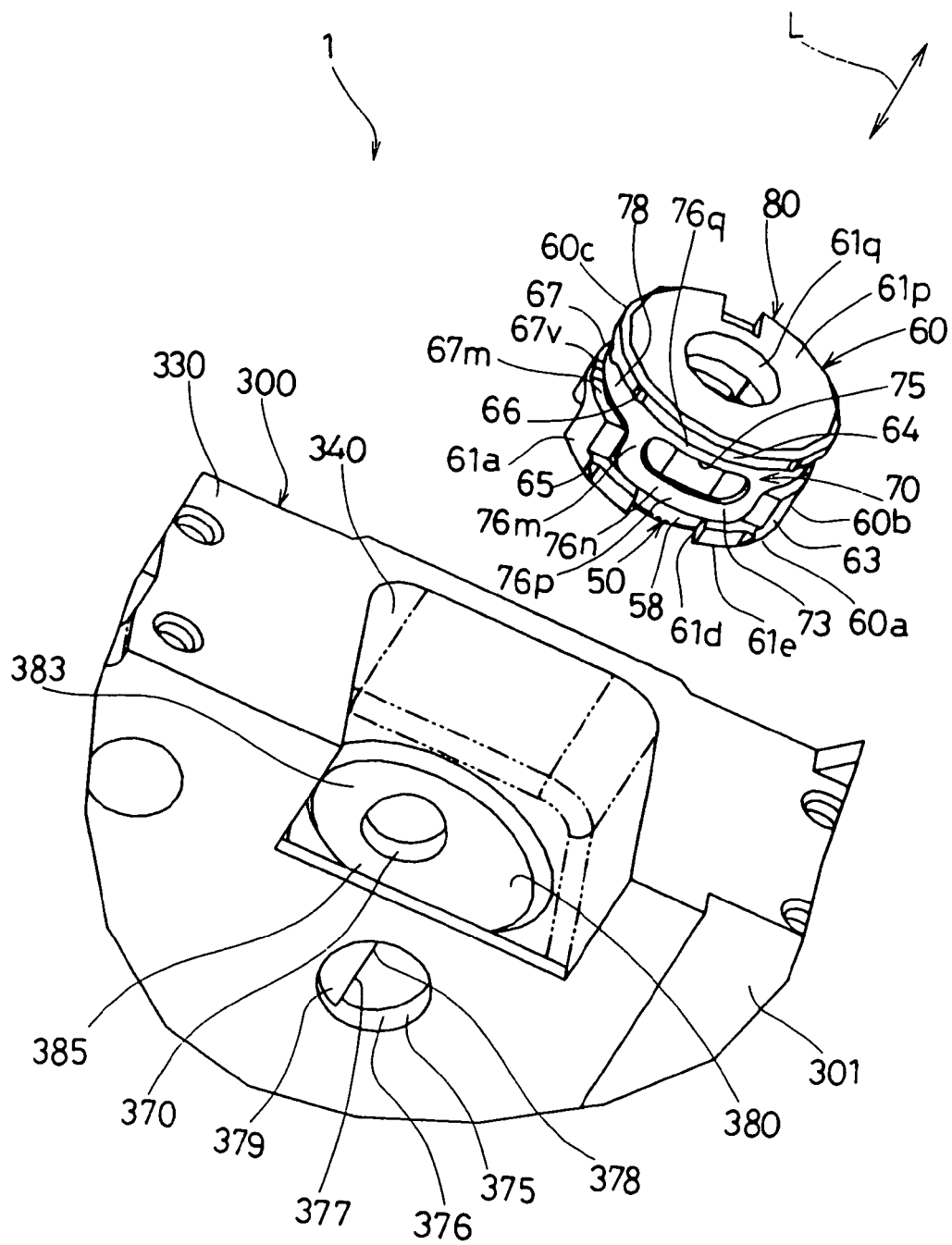
FIG. 4 is an enlarged and exploded perspective view showing a state in which a lens assembly is assembled in a housing.
Figure 5:
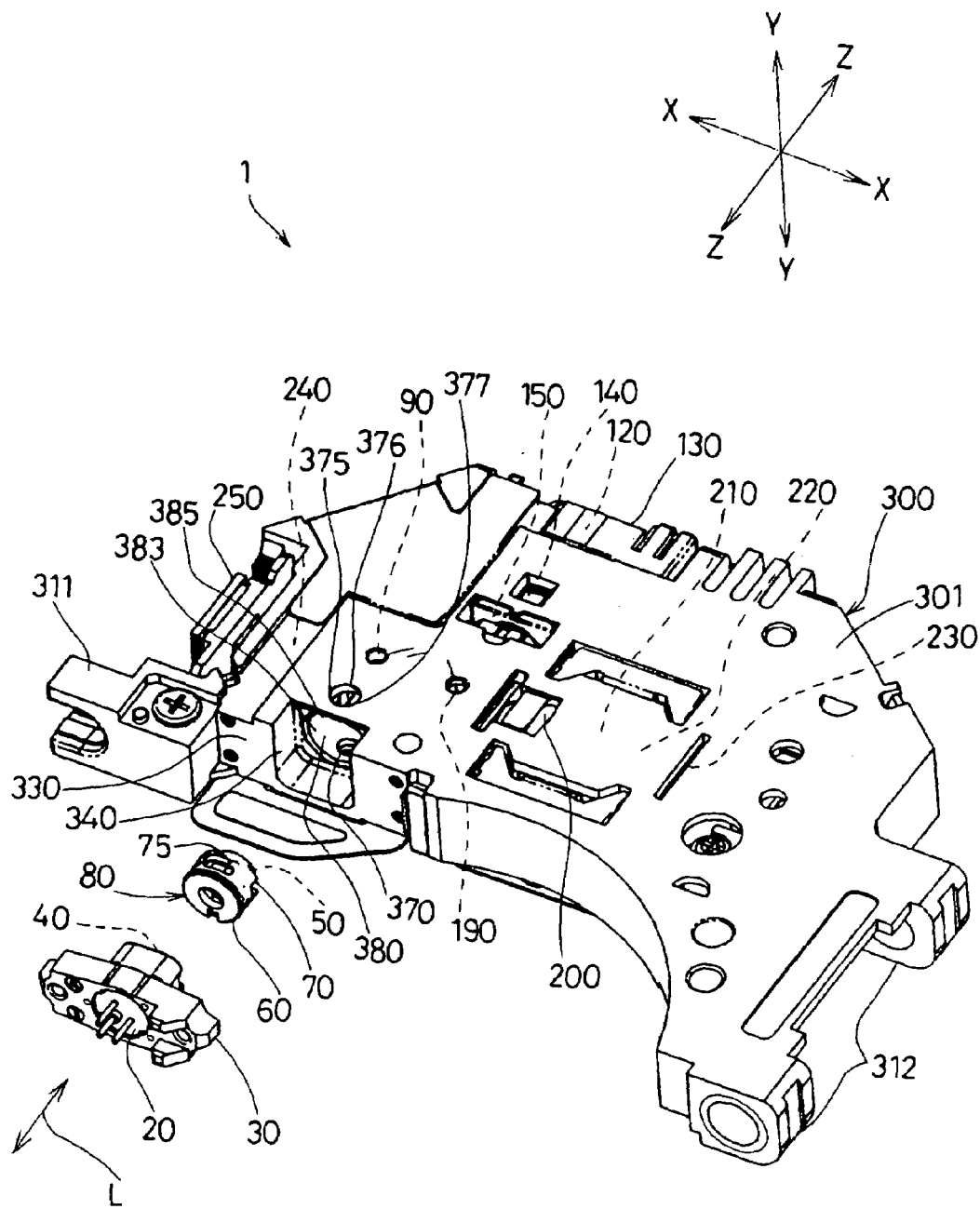
FIG. 5 is an exploded perspective view showing a state in which the optical pickup device is formed by assembling a lens assembly in a housing.

FIG. 1 is an enlarged and exploded perspective diagram showing an optical pickup device and a manufacturing method thereof according to a preferred embodiment of the present invention. FIGS. 2 and 3 are exploded perspective diagrams showing a state in which a lens assembly is formed by mounting a lens on a holder having a position adjusting member. FIG. 4 is an enlarged and exploded perspective diagram showing a state in which the lens assembly is assembled in a housing. FIG. 5 is an exploded perspective diagram showing a state in which an optical pickup device is formed by assembling the lens assembly to the housing.

Figure 6:
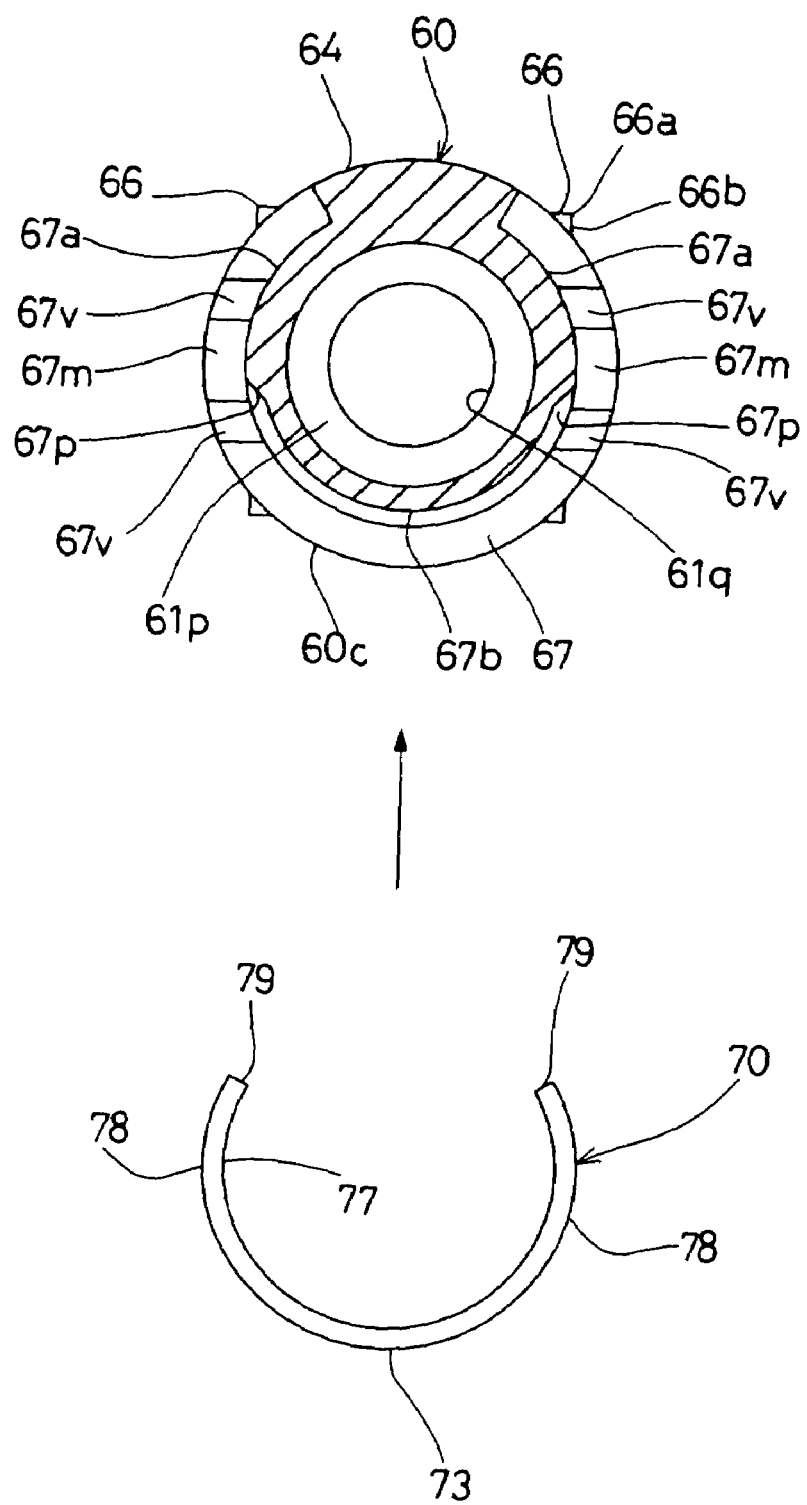
FIG. 6 is an explanatory diagram showing a state in which a position adjusting member is mounted on a holder.
Figure 7:
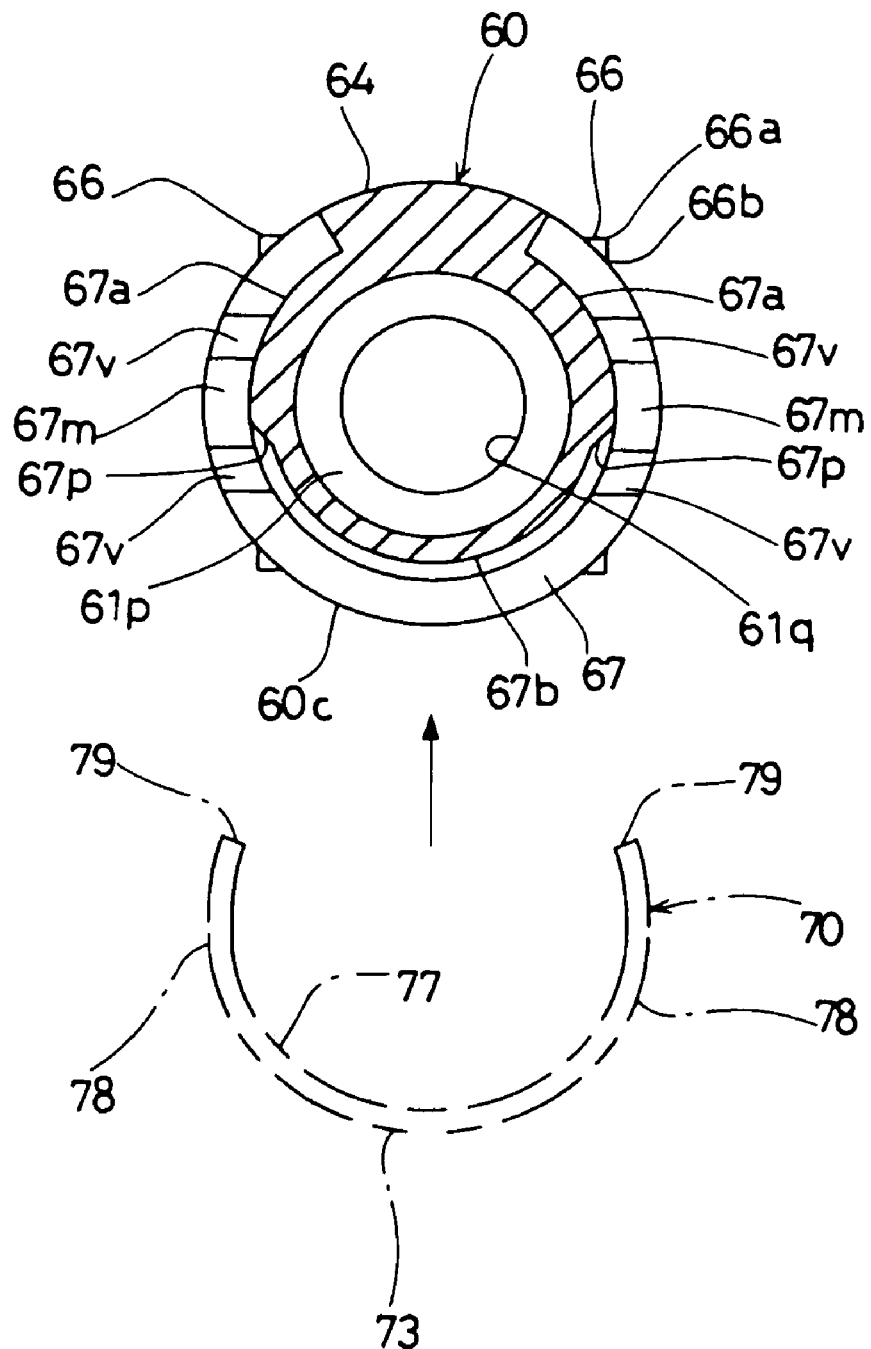
FIG. 7 is an explanatory diagram showing a state in which a position adjusting member is mounted on a holder.
Figure 8:
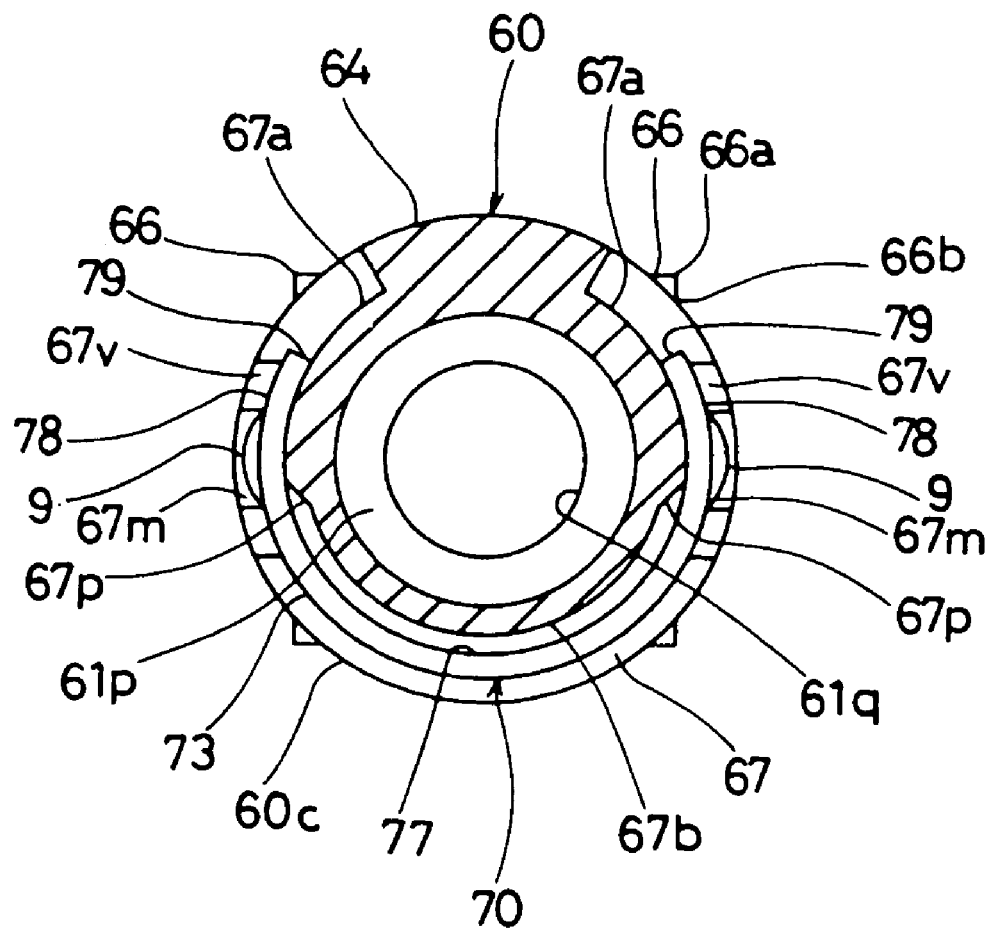
FIG. 8 is an explanatory diagram showing a state in which a position adjusting member is mounted on a holder.
Figure 9:
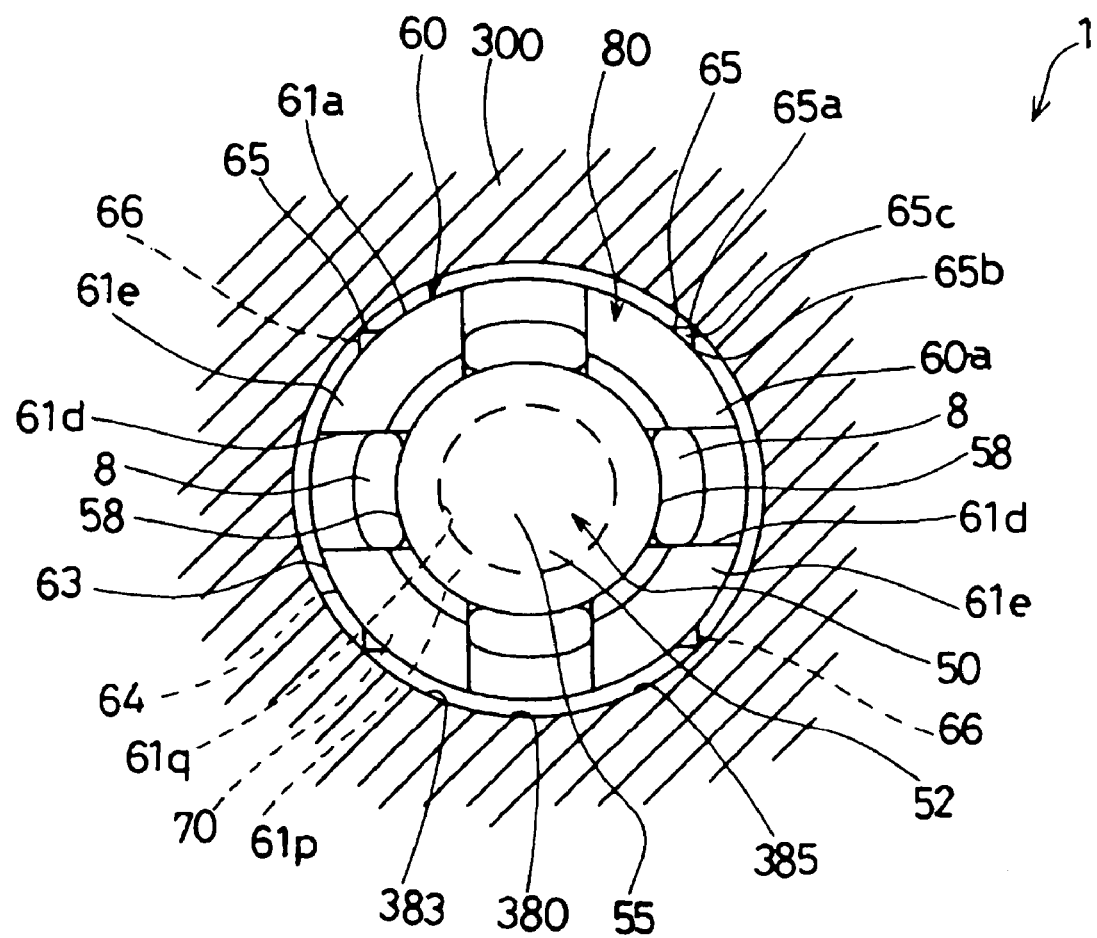
FIG. 9 is an explanatory diagram showing a state in which a lens assembly is assembled in a housing.
Figure 10:
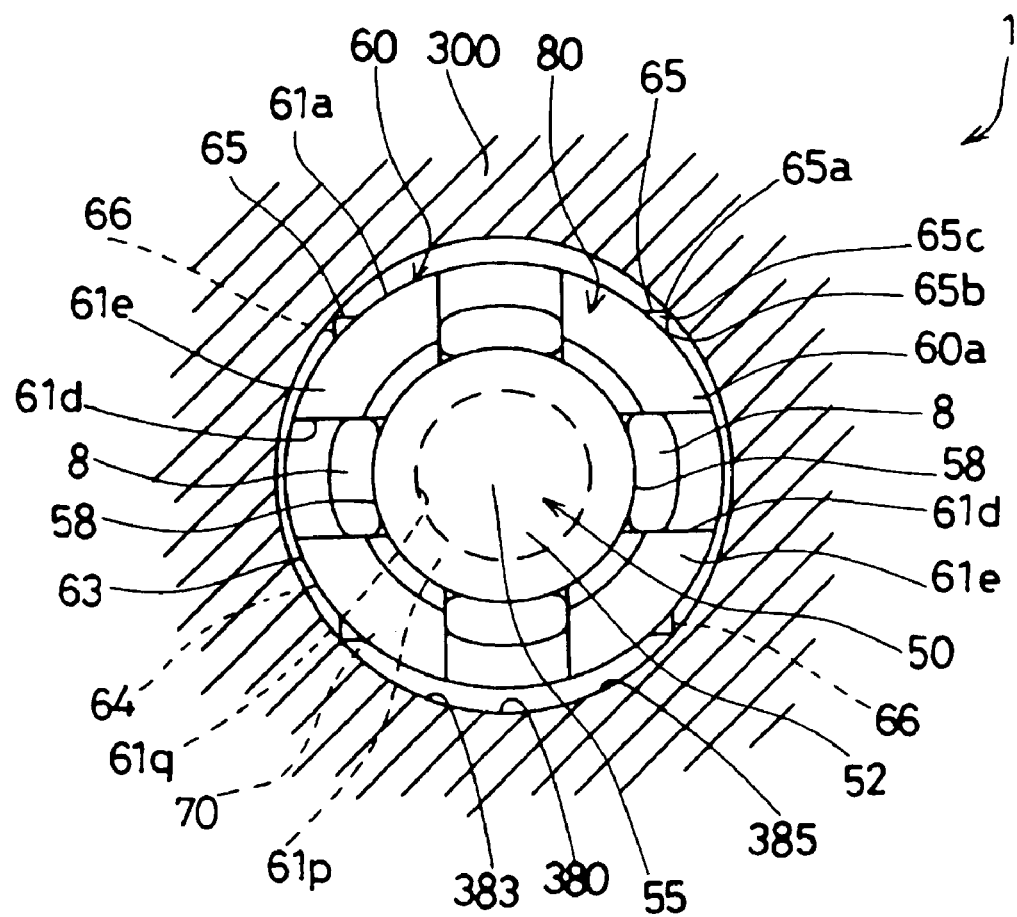
FIG. 10 is an explanatory diagram showing a state in which a lens assembly is assembled in a housing.
Figure 11:
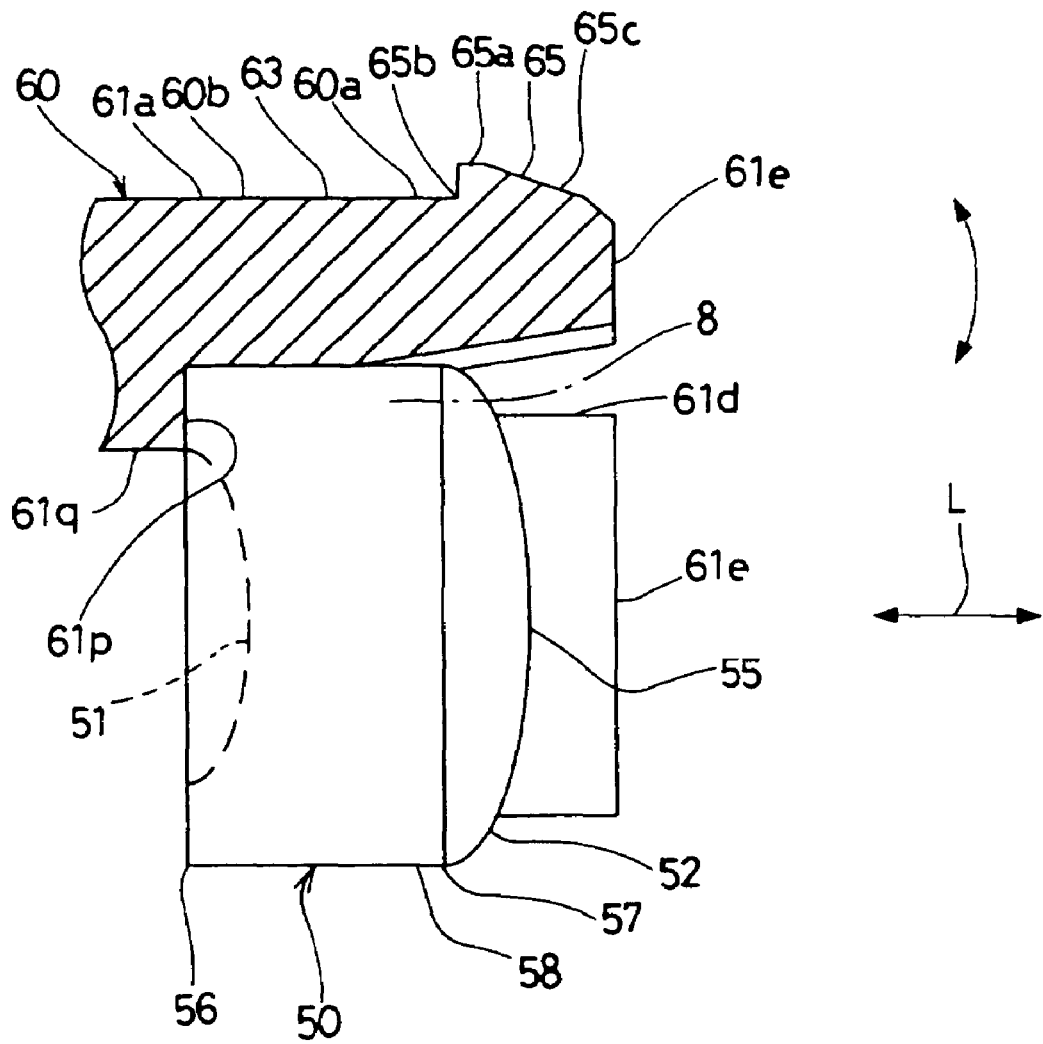
FIG. 11 is an enlarged explanatory diagram showing a state in which a lens is mounted on a holder.
Figure 12:
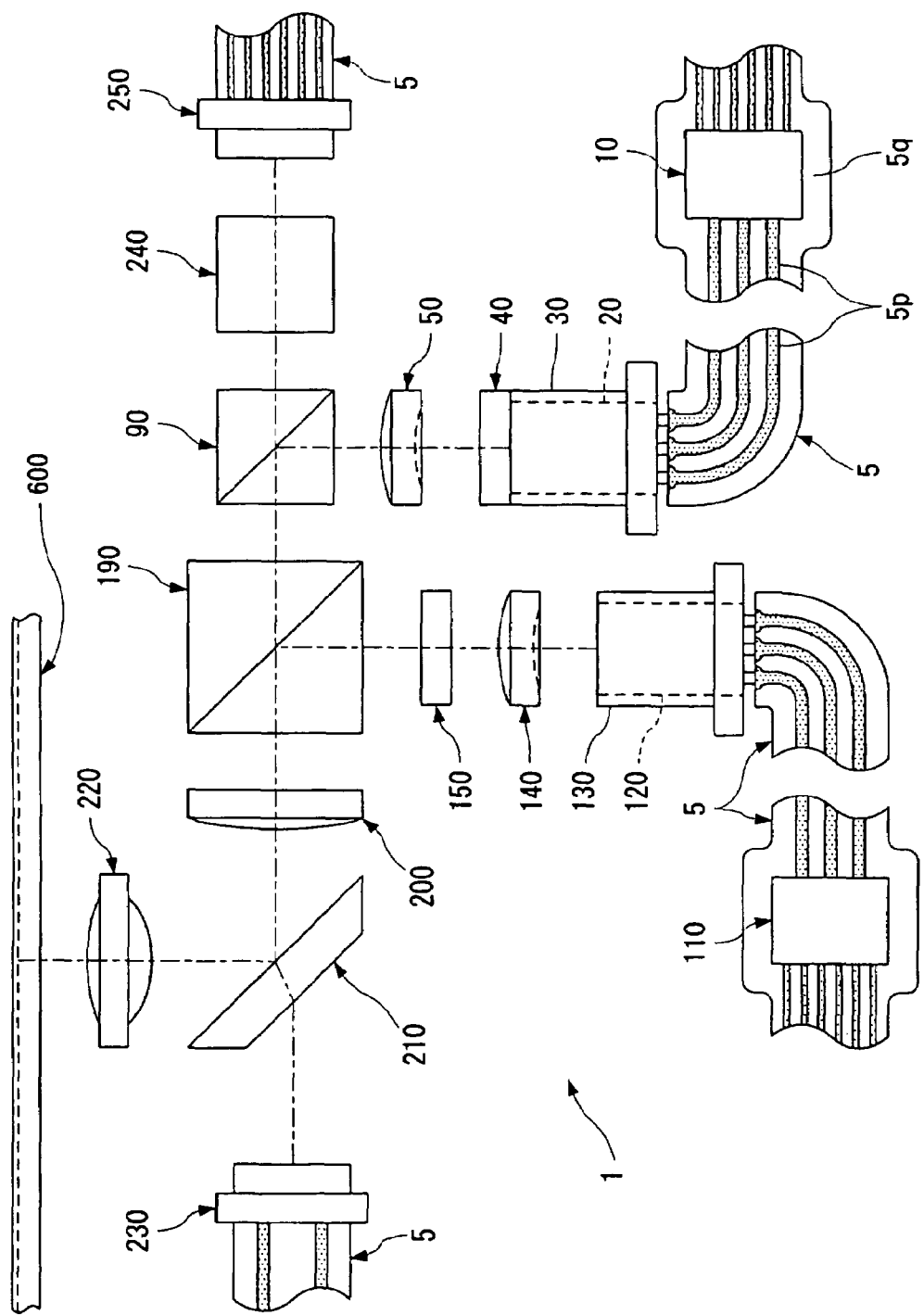
FIG. 12 is an explanatory diagram showing an optical path of an optical pickup device.
Figure 13A:
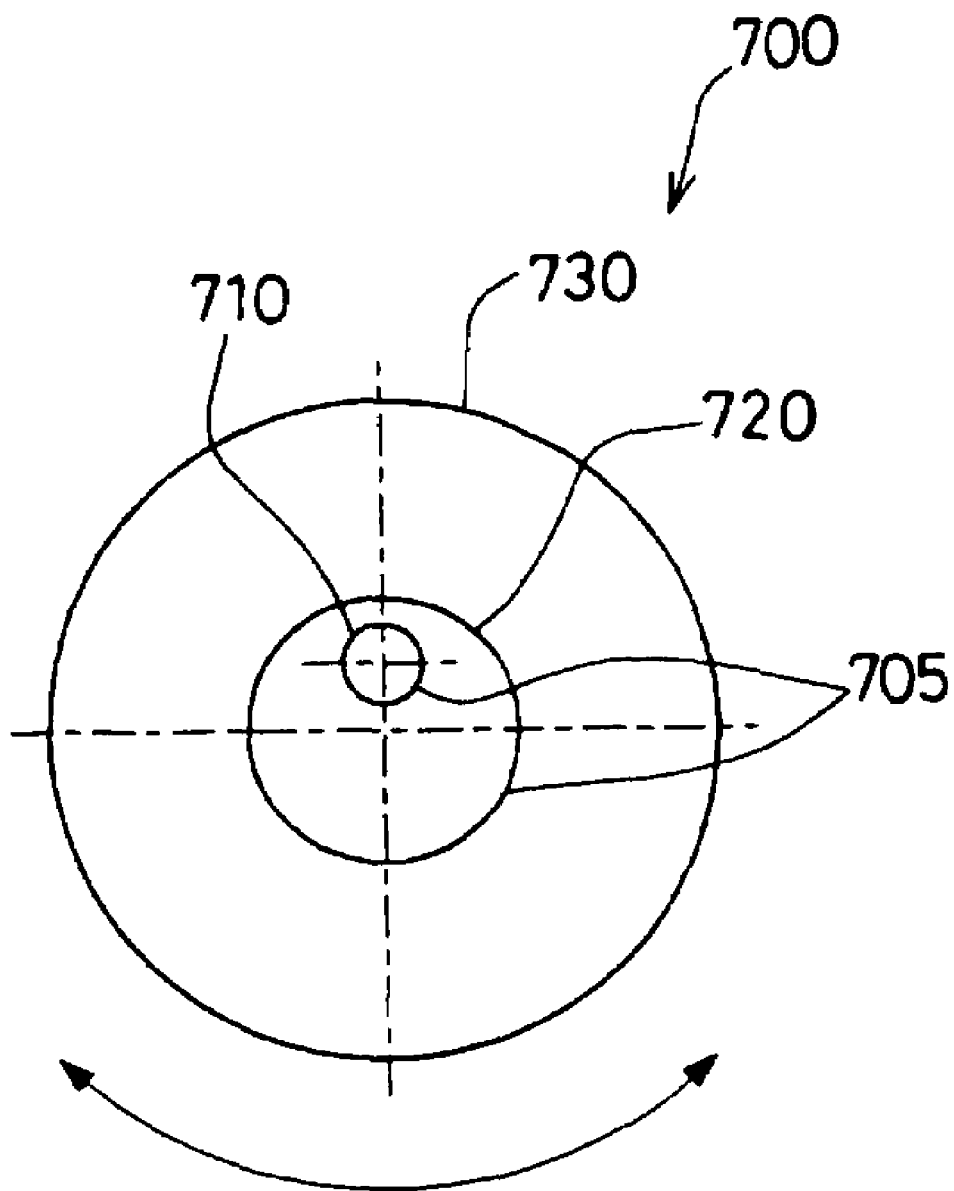
FIG. 13A is a side view exemplifying a jig which is used in an optical pickup device.
Figure 13B:
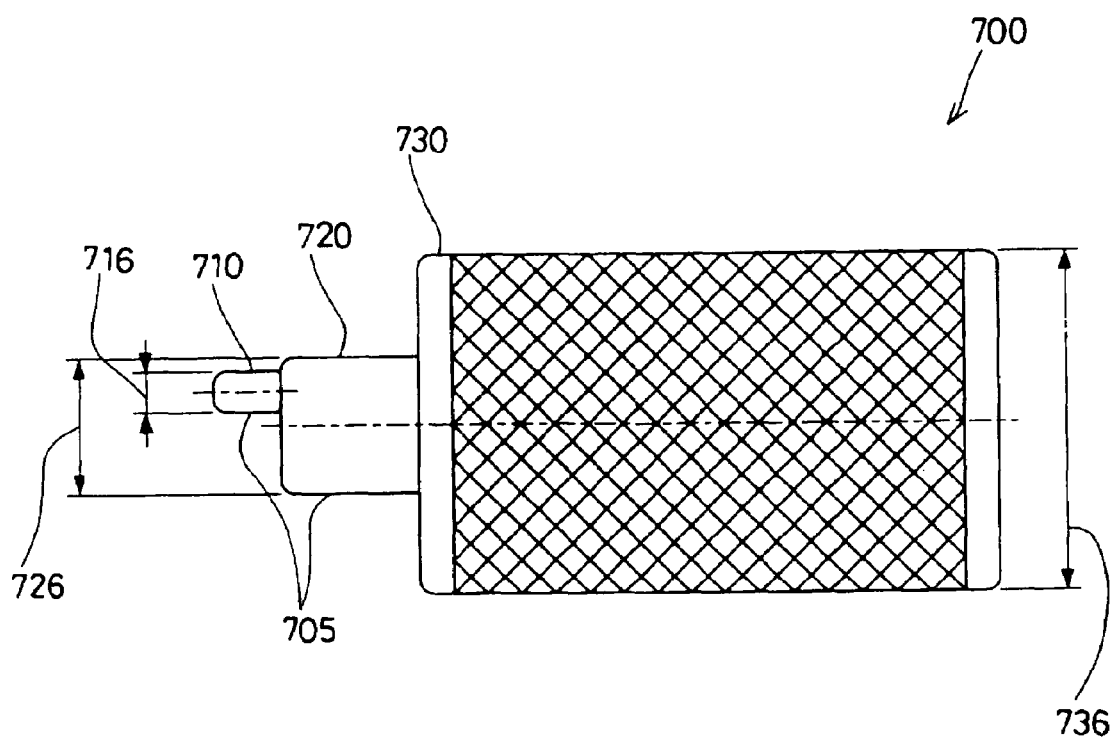
FIG. 13B is a front view exemplifying a jig which is used in an optical pickup device.
Figure 14:
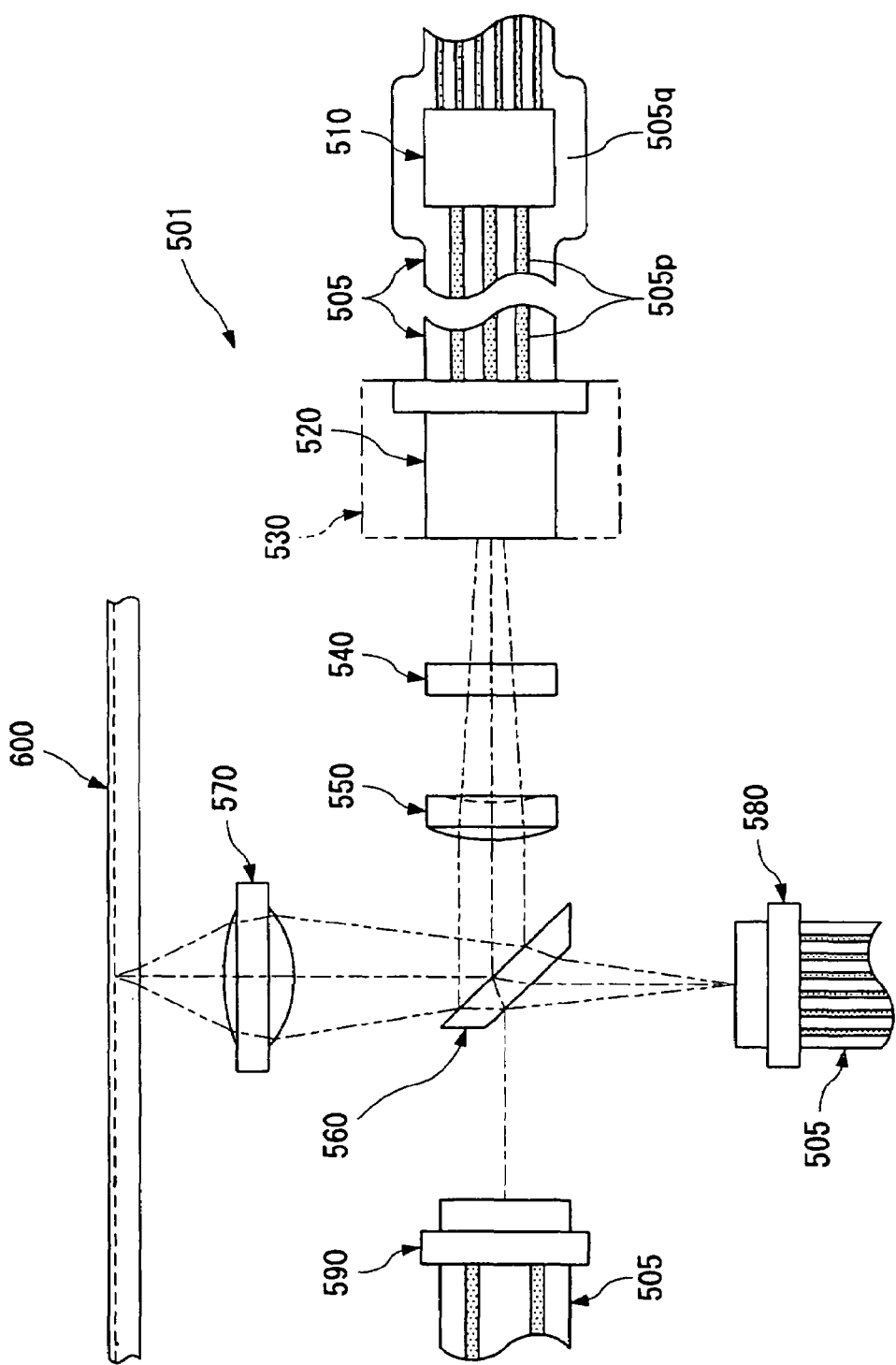
FIG. 14 is an explanatory diagram showing an optical pickup device according to related art.

FIGS. 6-8 are explanatory diagrams showing a state in which a position adjusting member is being mounted on a holder. FIGS. 9 and 10 are explanatory diagrams showing a state in which the lens assembly is assembled in the housing. FIG. 11 is an enlarged explanatory diagram showing a state in which the lens is mounted on the holder. FIG. 12 is an explanatory diagram showing an optical path of the optical pickup device. FIGS. 13A and 13B are a side view and a front view exemplifying a jig which is used in the optical pickup device.

FIG. 5 is a diagram showing the optical pickup device seen from below. Directions of the optical pickup device 1 will now be described referring to FIG. 5. A depth direction of the optical pickup device 1 is defined as an X-axis direction, a height direction of the optical pickup device 1 is defined as a Y-axis direction, and a width direction of the optical pickup device 1 is defined as a Z-axis direction. The definition of the X-axis direction, Y-axis direction, and Z-axis direction in this description is for explaining the optical pickup device 1. The optical pickup device is abbreviated in this description as "OPU".

Data such as information is replayed from or recoded on a media 600 (FIG. 12) using the optical pickup device 1 (FIGS. 5 and 12). As the media 600, for example, it is possible to use various optical disks such as a read-only optical disk such as a CD-ROM and a DVD-ROM, a write-once optical disk such as a CD-R, a DVD-R, and a DVD+R, and an optical disk which can be written/deleted and rewritten such as a CD-RW, a DVD-RW, a DVD+RW, and DVD-RAM.

The term "CD" is an abbreviation for "Compact Disc". The term "DVD" is an abbreviation for "Digital Versatile Disc" or "Digital Video Disc". The term "ROM" in "CD-ROM" and "DVD-ROM" is an abbreviation for "Read Only Memory". The CD-ROM and DVD-ROM can only be read. The term "R" in "CD-R", "DVD-R", and "DVD+R" is an abbreviation for "Recordable". Data can be recorded on the CD-R, DVD-R, and DVD+R. The term "RW" in "CD-RW", "DVD-RW", and "DVD+RW" is an abbreviation for "ReWritable". Therefore, data can be rewritten to the CD-RW, DVD-RW, and DVD+RW. The term "DVD-RAM" is an abbreviation for "Digital Versatile Disc Random Access Memory". Data can be read, written, and deleted in DVD-RAM.

The optical pickup device 1 replays data recorded on various optical disks or records data on various recordable or rewritable optical disks. The optical pickup device 1 corresponds to a CD-based media and DVD-based media.

When a current is applied from a laser driver 10 (FIG. 12) for CD to a light emitting element 20 for CD, laser light is output from the light emitting element 20 for CD. The light emitting element 20 for CD may be a laser diode 20 for CD which emits laser light having a wavelength of approximately 780 nm-790 nm (nanometer). A laser diode is abbreviated in this description as "LD". The LD 20 for CD is stored in a laser holder 30. The laser holder 30 stores the LD 20 for CD. The laser holder is abbreviated in this description as "LD holder".

A laser driver (LDD) is a laser driver circuit which drives the LD 20 to allow laser light to be emitted from the LD 20. The laser driver is abbreviated in this description as "LDD". When a current is supplied form the LDD 10 to the LD 20, laser light is emitted from the LD 20. Information is recorded on a disk 600 such as CD-R or information is read from a disk 600 such as CD-R using the laser light.

The laser light output from the LD 20 transmits through a ½ wave retardation plate-plus-diffraction grating 40 and a divergent lens 50, is refracted in and transmits through a first prism 90 in an approximate right angle, transmits through a second prism 190 and a collimator lens 200, is reflected by a half mirror 210 at an approximate right angle, transmits through an objective lens 220, and is irradiated onto the disk 600.

The ½ wave retardation plate-plus-diffraction grating 40 is formed by combining a ½ wave retardation plate and a diffraction grating in one structure. The diffraction grating separates laser light emitted from the LD 20 into several components using diffraction of light. More specifically, the diffraction grating separates the laser light emitted from the LD 20 into a main beam and two sub-beams using diffraction of light. The ½ wave retardation plate transforms linearly polarized light (S wave) into linearly polarized light (P wave). The ½ wave retardation plate-plus-diffraction grating 40 has characteristics of both of these structures.

The divergent lens 50 collects laser light emitted from the LD 20. The prisms 90 and 190 are provided on an optical path of the laser light in order to prevent astigmatism to appear in the laser light irradiated on the disk 600 when the laser light for DVD transmits through the prisms 90 and 190. Astigmatism refers to, for example, defocusing.

The collimator lens 200 transforms light entering the lens 200 from the side of the prism 190 into approximately parallel light. The term "parallel light" refers to light in which the rays of light do not widen and transmit in a parallel manner. Diffused light, on the other hand, refers to light which diffuses in various ways. The half mirror 210 allows approximately a half of the light to transmit and reflects the other half. Glass having a superior transmittance of light is used for the half mirror 210. The half mirror is abbreviated in this description as "HM".

The objective lens 220 focuses the laser light emitted from the LD 20 on the disk 600. The objective lens is abbreviated in this description as "OBL". The OBL 220 made of a synthetic resin is mounted on a lens holder (not shown) made of a synthetic resin.

When a focus servo operation of the lens holder having the OBL 220 with respect to the disk 600 is performed, the lens holder is moved along the Y-axis direction shown on FIG. 5. When a tracking servo operation of the lens holder with respect to the disk 600 (FIG. 12) is performed, the lens holder is moved along the Z-axis direction shown on FIG. 5.

The term "focusing" refers to "point". The term "tracking" refers to tracing and observing a small pit (hole, depression), groove (channel), and wobble (meandering) formed on the disk 600 (FIG. 12) using light to define a position of a track which is drawn in a helical shape. The term "servo" or "servo mechanism" refers to a mechanism which measures a state of a control target, compares the measured value with a reference value, and automatically applies correction control.

A portion of the laser light output from the LD 20 transmits through the ½ wave retardation plate-plus-diffraction grating 40 and the divergent lens 50, is refracted in and transmits through the first prism 90 in an approximate right angle, transmits through the second prism 190, collimator lens 200, and HM 210, and enters a photodetector 230. A portion of the laser light is detected by the photodetector 230 behind the HM 210. As the photodetector 230, a front monitor diode 230 to which a portion of the laser light is irradiated can be used. The font monitor diode is abbreviated in this description as "FMD". The FMD 230 is used to monitor laser light output from the LD 20 and to apply feedback for controlling the LD 20. The FMD 230 is positioned in the housing 300 (FIG. 5) at one end (first end) of an optical path along the X-axis direction of the optical pickup device 1 (FIGS. 5 and 12).

In addition, a portion of the laser light reflected from the disk 600 (FIG. 12) transmits through the OBL 220, is reflected at the HM 210 in an approximate right angle, transmits through the collimator lens 200, second prism 190, first prism 90, and an anamorphic lens 240, and is incident on a photodiode IC 250. The photodiode IC 250 is positioned in the housing 300 (FIG. 5) at the other end (second end) of the optical path along the X-axis direction of the optical pickup device 1 (FIGS. 5 and 12).

The anamorphic lens 240 (FIG. 12) creates an astigmatism of laser light. The astigmatism refers to defocusing. The photodiode IC 250 is an optical detector which receives laser light reflected from the disk 600, converts the optical signal into an electrical signal, and operates a servo mechanism (not shown) of the lens holder (not shown) having OBL 220 which is a part of the optical pickup device. The photodiode IC is abbreviated in this description as "PDIC".

A current is supplied from a laser driver 110 (FIG. 12) for DVD to a light emitting element 120 for DVD and laser light is emitted from the light emitting element 120 for DVD. As the light emitting element 120 for DVD, it is possible to use a laser diode 120 for DVD which emits laser light having a wavelength of approximately 650 nm-660 nm (nanometer). The LD 120 for DVD is stored in a laser holder 130. The LDD 110 is a laser driver circuit which drives the LD 120 to allow laser light to be emitted from the LD 120. By supplying a current from the LDD 110 to the LD 120, laser light is emitted from the LD 120 and information is recorded to a disk 600 such as DVD-R or information recorded on the disk 600 such as DVD-R is replayed using the laser light.

The laser light output from the LD 120 transmits through a divergent lens 140 and a ½ wave retardation plate-plus-diffraction grating 150, is refracted in and transmits through the prism 190 at an approximate right angle, transmits through the collimator lens 200, is reflected by the half mirror 210 at an approximate right angle, transmits through the OBL 220, and is irradiated on the disk 600. A ½ wave retardation plate-plus-diffraction grating 150 is formed by combining a ½ wave retardation plate and a diffraction grating in one structure.

A portion of the laser light output from the LD 120 transmits through the divergent lens 140 and the ½ wave retardation plate-plus-diffraction grating 150, is refracted in and transmits through the prism 190 at an approximate right angle, transmits through the collimator lens 200 and HM 210, and enters the photodetector 230. A portion of the laser light emitted from the LD 120 is detected by the photodetector 230 behind the HM 210.

A portion of the laser light reflected from the disk 600 transmits through the OBL 220, is reflected by the HM 210 at an approximate right angle, transmits through the collimator lens 200, second prism 190, first prism 90, and anamorphic lens 240, and is incident on the photodiode IC 250.

The LDD 10, LD holder 30 having the LD 20, ½ wave retardation plate-plus-diffraction grating 40, divergent lens 50, first prism 90, LDD 110, LD holder 130 having the LD 120, divergent lens 140, ½ wave retardation plate-plus-diffraction grating 150, second prism 190, collimator lens 200, HM 210, OBL 220, FMD 230, anamorphic lens 240, and PDIC 250 are equipped in a housing 300 (FIG. 5). A housing refers to a box in which objects can be placed such as a box-shaped structure in which components are stored, or structures similar to a box. The HM 210 is fixed within the housing in a tilted state with respect to the collimator lens 200 (FIG. 12), OBL 220, and FMD 230.

The LD 20, ½ wave retardation plate-plus-diffraction grating 40, divergent lens 50, first prism 90, LD 120, divergent lens 140, ½ wave retardation plate-plus-diffraction grating 150, second prism 190, collimator lens 200, HM 210, OBL 220, FMD 230, anamorphic lens 240, and PDIC 250 are optical components which are part of the optical pickup device 1.

The LDD 10, LD 20, LDD 110, LD 120, FMD 230, and PDIC 250 are connected to a flexible substrate 5 such as a flexible printed circuit in an electrically conductive manner. The flexible printed circuit is also mounted on the housing 300 (FIG. 5). The flexible printed circuit is abbreviated in this description as "FPC". A plurality of circuit conductors $5p$ (FIG. 12) are printed on an insulating sheet $5q$, a metal foil $5p$ such as, for example, a copper foil is provided on the insulating sheet $5q$, and a transparent or semi-transparent protection layer (not shown) is provided on the metal foil $5p$ to form the flexible substrate 5.

When soldering is performed, the various electronic/electrical components such as LDDs 10 and 110, LDs 20 and 120, FMD 230, and PDIC 250 are connected to the flexible substrate 5 in an electrically conductive manner. For this purpose, a thermally resistant synthetic polymer such as a polyimide-based resin having superior thermal resistance is used as the insulating sheet 5q of the flexible substrate 5. An example of the FPC 5 in which the insulating sheet 5q is formed using polyimide resin is a product manufactured by Nitto Denko Corp.

As a soldering material, a solder which is commonly referred to as "lead-free solder" having no lead is used in consideration of the environment. If a lead-free solder is used as the soldering material, when the optical pickup device 1 or the flexible substrate 5 equipped in the optical pickup device 1 is disposed, for example, it is possible to avoid affecting the natural environment with lead. An example of the lead-free solder is ECO SOLDER M30 manufactured by Senju Metal Industry Company. It is also possible to use a normal soldering material in place of the lead-free solder. An example of the normal soldering material is Sparkle Paste OZ series manufactured by Senju Metal Industry Company.

The housing 300 which is a part of the optical pickup device 1 (FIG. 5) is formed using a die-cast alloy including magnesium (Mg). The housing 300 comprises a housing body 301 in which each component is equipped, a first guide 311 which is formed projecting from the housing body 301 and which is matched with a first guide axis (not shown) which is a part of the optical disk device (not shown), and a pair of second guides 312 and 312 which are formed projecting from the housing body 301 in an opposite direction from the extension direction of the first guide 311 and which are matched with a second guide axis (not shown) which is a part of the optical disk device (not shown).

The optical pickup device 1 comprises various components. The optical pickup device 1 may comprise components in addition to the structures shown on the drawings.

The optical pickup device 1 (FIG. 5) comprises at least a substantially colorless and transparent lens 50 made of a synthetic resin and which allows laser light to transmit through (FIGS. 1 and 12), a holder 60 made of a synthetic resin and to which the lens 50 (FIG. 1) is mounted, a position adjusting member 70 made of a metal and which is mounted on the holder 60, and a housing 300 made of a metal and to which the holder 60 is mounted.

The lens 50 (FIGS. 1-5 and 9-12) is formed as the divergent lens 50 (FIGS. 1-4 and 12) for collecting laser light output from the LD 20 (FIG. 12). As shown in FIG. 11, a curved-surface depression 51 is provided on the side of an end (first end) 56 of the lens 50 and a curved-surface projection 52 is provided on the side of another end (second end) 57 of the lens 50.

A lens assembly 80 is formed as shown in FIGS. 4 and 5 by mounting the lens 50 and the position adjusting member 70 on the holder 60 (FIGS. 1-3). When the lens assembly 80 is assembled to the housing 300, the lens assembly 80 is assembled in a state in which the mounting position with respect to the housing 300 can be adjusted.

With these structures formed, the lens assembly 80 can be precisely assembled in the housing 300. Because the lens assembly 80 having a substantially colorless and transparent lens 50 made of a synthetic resin and which allows laser light to transmit through, a holder 60 made of a synthetic resin and to which the lens 50 is mounted, and a position adjusting member 70 made of a metal and which is mounted to the holder 60 is assembled in the housing 300 in a state in which the mounting position can be adjusted, the lens assembly 80 is assembled in the housing 300 with high precision.

Therefore, the lens assembly 80 having the lens 50 is assembled in the housing 300 with high precision, and it is therefore possible to provide the optical pickup device 1 in which the optical path is precisely adjusted with respect to each optical component (FIG. 12) equipped on the housing 300 to a manufacturer of an optical disk device or a manufacturer of the optical pickup device 1.

As shown in FIGS. 1, 4, and 5, a mounting hole 380 is provided in the housing 300 through which the lens assembly 80 can be inserted. The lens assembly 80 is assembled in the housing 300 while in a state of being pressed to and fitted within the mounting hole 380 of the housing 300.

With the lens assembly 80 being pressed to and fitted within the mounting hole 380, the lens assembly 80 does not fall out of the mounting hole 380 provided in the housing 300. Therefore, the lens assembly 80 is reliably inserted and mounted in the mounting hole 380. Because the lens assembly 80 is assembled in the housing 300 while being pressed to and fitted within the mounting hole 380, it is possible to prevent unintentional falling of the lens assembly 80 from the mounting hole 380 of the housing 300 during the assembling operation of the lens assembly 80 to the housing 300. Therefore, it is possible to prevent loss of sight of the lens assembly 80. Thus, the assembling operation of the lens assembly 80 to the housing 300 is performed efficiently and with a high yield.

As shown in FIGS. 1, 4, and 5, a mounting hole 380 having a shape of an approximate cylindrical hole to which the lens assembly 80 can be inserted while being pressed is provided in the housing 300. As shown in FIGS. 1-4, a plurality of protrusions 65 and 66 (FIGS. 1-4) which contact an inner peripheral surface 385 of the mounting hole 380 of the housing 300 (FIGS. 1 and 4) are provided on the outer peripheries 63 and 64 of the holder 60 having an approximate cylindrical shape and which is a part of the lens assembly 80.

Because these plurality of protrusions 65 and 66 are formed on the outer peripheries 63 and 64 of the holder 60, the lens assembly 80 is reliably inserted and mounted to the mounting hole 380 of the housing 300. When the lens assembly 80 having the holder 60 is inserted and mounted to the mounting hole 380, the protrusions 65 and 66 provided on the outer peripheries 63 and 64 contact the inner peripheral surface 385 of the mounting hole 380. With this structure, the lens assembly 80 is reliably held in a storage section 383 of the mounting hole 380. Thus, the lens assembly 80 is reliably assembled in the housing 300.

As shown in FIGS. 2 and 3, the holder 60 is formed in an approximate cylindrical shape. The holder 60 has a base wall 61p having an approximate hollow disc shape and against which an end 56 of the lens 50 is contacted and a peripheral wall 61a having an approximate cylindrical shape which is formed extending along a direction approximately perpendicular to the base wall 61p. A through hole 61q through which the laser light is allowed to transmit is formed in the base wall 61p.

When the holder 60 is seen from the front (FIGS. 6-10) or back, four protrusions 65 and 66 are provided on the outer peripheries 63 and 64 of the holder 60. When the holder 60 is seen from the front or back, the protrusions 65 and 66 are provided on the circumference of the outer peripheries 63 and 64 of the holder 60 with approximately the same spacing along the circumference direction of the outer peripheries 63 and 64 having an approximate cylindrical shape. In other words, the protrusions 65 and 66 are separated with approximately the same spacing on the circumference of the outer peripheries 63 and 64. When the holder 60 is seen from the front or back, the protrusions 65 and 66 are positioned on lines radially extending from the center of the holder 60.

With these protrusions 65 and 66 formed on the outer peripheries 63 and 64, even when the precision of the size within the storage 393 of the mounting hole 380 provided in the housing 300 is slightly low, it is possible to assemble the lens assembly 80 to the housing 300 in a correct position and orientation. Because a plurality of protrusions 65 and 66 are provided in approximate same spacing along the circumference direction of the outer peripheries 63 and 64 having an approximate cylindrical shape, change of position and orientation of the lens assembly 80 during insertion of the lens assembly 80 in the mounting hole 380 and adjustment of the mounting position of the lens assembly 80 with respect to the housing is inhibited. Therefore, it is possible to avoid deviation in position and orientation of the lens assembly 80 when the mounting position of the lens assembly 80 assembled to the housing 300 is adjusted, and the lens assembly 80 is assembled to the housing 300 while in a state in which the position and orientation are correctly configured.

As shown in FIGS. 1 and 4, a side of the holder 60 from which the holder 60 is inserted to the mounting hole 380 is defined as the side 60a of the head portion of the holder 60. A side opposite to the head portion side 60a, that is, the side on which the holder 60 is pressed when a jig element (not shown) is used and the holder 60 is inserted to the mounting hole 380, is defined as a side 60c of a rear portion of the holder 60. The front and rear directions of the holder 60 are defined in this manner.

As shown in FIGS. 1-4, a plurality of protrusions 65 and 66 are provided on both the head portion side 60a and the rear portion side 60c of the holder 60. All of a total of 8 protrusions 65 and 66 provided on the outer peripheries 63 and 64 of the holder 60 having an approximate cylindrical shape contact the inner peripheral surface 385 of the mounting hole 380 provided in the housing 300 (FIGS. 1, 4, 9, and 10).

With the plurality of protrusions 65 and 66 provided on both the head portion side 60a and the rear portion side 60c of the holder 60, even when the precision of the size within the storage 383 of the mounting hole 380 is slightly low, the lens assembly 80 having the holder 60 is reliably assembled within the storage 383 of the mounting hole 380 of the housing 300. Because the protrusions 65 and 66 are provided on the head portion side 60a and the rear portion side 60c of the holder 60, change of the position and orientation of the lens assembly 80 is inhibited during insertion of the lens assembly 80 in the mounting hole 380 and adjustment of the mounting position of the lens assembly 80 with respect to the housing 300. Therefore, it is possible to prevent deviation in the position and orientation of the lens assembly 80 when the mounting position of the lens assembly 80 mounted in the housing 300 is adjusted, and the lens assembly 80 is assembled in the housing 300 in a correct position and a correct orientation.

As shown in FIGS. 1-3, the holder 60 is formed in an approximate cylindrical shape. As shown in FIGS. 6-10, when the holder 60 is seen from a side which allows observation of the holder 60 in a ring shape, the protrusions 65 and 66 are formed in an approximate triangular shape. Bases 65b and 66b of the protrusions 65 and 66 corresponding to the base of the triangle are provided on the outer peripheries 63 and 64 of the holder 60. As shown in FIGS. 9 and 10, tips 65a and 66a of the protrusions 65 and 66 corresponding to the vertex of the triangle come into contact with the inner peripheral surface 385 of the mounting hole 380 having an approximate circular hole shape. When the lens assembly 80 is pressed into the mounting hole 380, the tips 65a and 66a of the protrusions 65 and 66 are slightly trimmed.

With the protrusions 65 and 66 provided on the holder 60, the lens assembly 80 having the holder 60 is assembled in the housing 300 in a state in which the lens assembly 80 having the holder 60 is pressed into the mounting hole 380 provided in the housing 300. Because the tips 65a and 66a of the protrusions 65 and 66 provided on the outer peripheries 63 and 64 having an approximate cylindrical shape are in contact with the inner peripheral surface 385 of the mounting hole 380, even when there is a slight "variation" in the size within the mounting hole 380 having an approximate circular hole shape, the influences of the "variation" in the size within the mounting hole 380 is absorbed by the tips 65a and 66a of the protrusions 65 and 66. Therefore, the lens assembly 80 is inserted and mounted in the mounting hole 380 of the housing 300 without being affected by the variation in the size of the mounting hole 380.

As shown in FIGS. 4 and 5, an inclined guide 65c (FIGS. 2, 3, and 11) for facilitating insertion of the holder 60 which is a part of the lens assembly 80 into the mounting hole 380 when the lens assembly 80 is inserted in the mounting hole 380 is provided on a front side of the protrusion 65 of the holder 60. That is, the inclined guide 65c is provided on a front side of the protrusion 65 at the head portion side 60a of the holder 60. The inclined guide 65c is formed as an inclined sliding contact surface 65c.

With the inclined sliding contact surface 65c provided on the front side of the protrusion 65 on the head portion side 60a, the holder 60 can be easily inserted in the mounting hole 380 when the holder 60 is inserted into the mounting hole 380. Because the inclined sliding contact surface 65c is provided on the protrusion 65, when the lens assembly 80 is inserted in the mounting hole 380, the protrusion 65 of the holder 60 is guided by the inclined sliding contact surface 65c provided on the protrusion 65. Therefore, the lens assembly 80 is easily inserted and mounted in the mounting hole 380 of the housing 300.

As shown in FIGS. 1, 4, and 5, a mounting hole 380 in which the lens assembly 80 can be inserted is provided in the housing 300. The side of the holder 60 from which the holder 60 is inserted to the mounting hole 380 is defined as the head portion 60a of the holder 60. A side opposite to the head portion 60a is defined as the rear portion 60c of the holder 60. A portion between the head portion 60a and the rear portion 60c of the holder 60 is defined as an intermediate portion 60b. As shown in FIGS. 2 and 3, the peripheral wall 61a which is a part of the holder 60 and which has an approximate cylindrical shape is formed to become thinner from the intermediate portion 60b of the holder 60 toward the head portion 60a of the holder 60.

With the holder 60 formed in such a shape, it is possible to easily insert the holder 60 into the mounting hole 380 of the housing 300 without applying unnecessary force on the head portion 60a of the holder 60 when the holder 60 is inserted in the mounting hole 380. Because the peripheral wall 61a having an approximate cylindrical shape is formed to become thinner from the intermediate portion 60b of the holder 60 toward the head portion 60a of the holder 60, the head portion 60a of the holder 60 has superior flexibility. Because the head portion 60a of the holder 60 is superior in flexibility, application of an excessive force to the holder 60 when the holder 60 is inserted in the mounting hole 380 is inhibited.

In addition, because the peripheral wall 61a having an approximate cylindrical shape is formed to become thinner from the intermediate portion 60b of the holder 60 toward the head portion 60a of the holder 60, and the protrusion 65 which contacts the inner peripheral surface 385 of the mounting hole 380 is provided on the outer periphery 63 of the head portion 60a, the head portion 60a of the holder 60 can suitably deflect when the lens assembly 80 is inserted into the mounting hole 380.

Therefore, it is possible to prevent trimming of the protrusion 65 provided on the outer periphery 63 on the side of the head portion 60a when the lens assembly 80 is inserted in the mounting hole 380. In addition, it is also possible to prevent trimming of the protrusion 65 provided on the periphery 63 of the head portion 60*a* when the mounting position of the lens assembly 80 with respect to the housing 300 is adjusted.

As shown in FIGS. 1, 4, and 5, a mounting hole 380 into which the lens assembly 80 can be inserted is provided in the housing 300. As shown in FIGS. 2 and 3, a plurality of cutaway portions 61*d* are provided in the head portion 60*a* of the holder 60. The head portion 60*a* of the holder 60 comprises a plurality of divided protrusions 61*e*.

More specifically, a plurality of cutaway portions 61*d* (FIGS. 2 and 3) are provided on the head portion 60*a* of the holder 60 so that the holder 60 can be fitted into the mounting hole 380 while being pressed and inserted, in consideration of a size error of the mounting hole 380 provided in the housing 300 (FIGS. 1, 4, and 5). The head portion 60*a* of the holder 60 comprises a plurality of divided protruding pieces 61*e*.

With the holder 60 formed in such a shape, even when the precision of the size of the mounting hole 380 of the housing 300 or the like is slightly low, the holder 60 which is a part of the lens assembly 80 can be reliably inserted into the mounting hole 380. Because a plurality of cutaway portions 61*d* are provided on the head portion 60*a* and a plurality of protruding pieces 61*e* are provided on the head portion 60*a*, even when the mounting hole 380 is formed in an approximate elliptical shape as shown in FIG. 10, the head portion 60*a* can be easily inserted into the mounting hole 380. Therefore, the holder 60 is reliably inserted and mounted into the mounting hole 380. As shown in FIGS. 2, 3, 9 and 10, the head portion 60*a* is divided into four sections. However, the present embodiment is not limited to such a configuration and the head portion 60*a* of the holder 60 may, for example, be alternatively divided into two sections (not shown).

When the lens 50 is fixed to the holder 60, an adhesive 8 (FIGS. 9 and 10) is applied to the cutaway portion 61*d* of the holder 60. The lens 50 is fixed to the holder 60 (FIGS. 9 and 10) when the cutaway portion 61*d* of the holder 60 (FIGS. 2 and 3) and a periphery 58 of the lens 50 are adhered.

In this manner, when the lens 50 and the holder 60 are adhered, the lens 50 is reliably fixed to the holder 60. Because the holder 60 holds the lens 50 and the adhesive 8 is applied to the cutaway portion 61*d* provided on the head portion 60*a* of the holder 60, the cutaway portion 61*d* of the holder 60 and the periphery 58 of the lens 50 are adhered. Therefore, it is possible, for example, to avoid adverse effect on the light transmitting through the lens 50 by application of the adhesive 8 on the approximate center 55 of the lens 50.

When the lens 50 is fixed to the holder 60, the lens 50 is fixed to the holder 60 using an ultraviolet curable adhesive 8 (FIGS. 9 and 10) which is cured with irradiation of ultraviolet rays. With the ultraviolet curable adhesive 8 applied to the cutaway portion 61*d* of the holder 60 to which the lens 50 is mounted, the lens 50 is adhered and fixed to the holder 60.

By adhering using the ultraviolet curable adhesive 8 which is cured with irradiation of ultraviolet rays, it is possible to easily and quickly fix the lens 50 to the holder 60. By irradiating the ultraviolet curable adhesive 8 with ultraviolet rays, curing reaction of the ultraviolet curable adhesive 8 is accelerated and the lens 50 is quickly adhered to the holder 60. The lens 50 is fixed to the housing 300 with high precision.

As the ultraviolet curable adhesive which is one type of optically curable adhesive, for example, it is possible to use optical UV adhesive NOA 77 manufactured by Norland Products Inc. of the United States. The ultraviolet curable adhesive such as the optical UV adhesive NOA 77 is a one-pack type acryl-based ultraviolet curable adhesive. Therefore, it is not necessary to mix solutions as in a two-pack type ultraviolet curable adhesive. Thus, it is possible to quickly and efficiently apply the adhesive. The term "UV" is an abbreviation for ultraviolet. The ultraviolet curable adhesive is also called UV curable adhesive. Depending on a design specification of the optical pickup device and the flexible substrate, for example, it is also possible to perform the adhesion process using a two-pack type ultraviolet curable adhesive. As the two-pack type ultraviolet curable adhesive, for example, it is possible to use a two-pack type epoxy-based ultraviolet curable adhesive.

As shown in FIGS. 6-8, the position adjusting elastic member 70 is a metal member for adjusting the position which has a spring characteristic. As shown in FIG. 6, the position adjusting elastic member 70 is formed in an approximate bow shape. The position adjusting elastic member 70 has an approximate C-shape when the position adjusting elastic member 70 is seen in a plane.

As shown in FIGS. 1-3, the holder 60 is formed in an approximate cylindrical shape and has a mounting channel 67 (FIGS. 1-4 and 6-8) having an approximate bow shape corresponding to the position adjusting elastic member 70. As shown in FIGS. 1 and 6-8, the mounting channel 67 comprises a first bottom 67*a* which the position adjusting elastic member 70 contacts, an inclined sliding contact portion 67*p* extending from the first bottom 67*a*, and a second bottom 67*b* extending from the inclined sliding contact portion 67*p* and positioned on a side nearer to the channel bottom than the first bottom 67*a*. As shown in FIGS. 1-4 and 6-8, the position adjusting elastic member 70 is equipped on the holder 60 matched to the mounting channel 67 of the holder 60.

With the mounting channel provided on the holder 60, it is possible to reliably match the position adjusting elastic member 70 which is formed in an approximate bow shape to the mounting channel 67 of the holder 60 which is formed in an approximate cylindrical shape. Therefore, it is possible to reliably attach the position adjusting elastic member 70 to the holder 60 along the mounting channel 67 of the holder 60.

As shown in FIGS. 6-8, when the position adjusting elastic member 70 which is formed in an approximate bow shape is mounted to the bow-shaped channel 67 of the holder 60, ends 79 and 79 of the position adjusting elastic member 70 are widened as shown in FIG. 7 and the position adjusting elastic member 70 is mounted on the mounting channel 67.

When the position adjusting elastic member 70 is mounted to the bow-shaped mounting channel 67, both ends 79 and 79 of the position adjusting elastic member 70 contact a pair of inclined sliding contact portions 67*p* and 67*p* provided on the bottoms 67*a* and 67*b* of the mounting channel 67. When the position adjusting elastic member 70 is pressed toward the holder 60 in this state, the ends 79 and 79 of the position adjusting elastic member 70 are widened by the inclined sliding contact portions 67*p* and 67*p* and ends 79 of the position adjusting elastic member 70 can move over the inclined sliding contact portions 67*p* within the bow-shaped channel 67.

As shown in FIG. 8, after the position adjusting elastic member 70 is completely mounted to the mounting channel 67, the ends 79 and 79 are narrowed by a recovering elastic force generated in the position adjusting elastic member 70 having a spring characteristic and the position adjusting elastic member 70 approximately returns to the original bow-shape. In this manner, the position adjusting elastic member 70 is fitted to the mounting channel 67 of the holder 60 (FIGS. 2 and 3).

With the position adjusting elastic member 70 having the spring characteristic, the position adjusting elastic member 70 formed in a bow shape can be reliably fitted to the mounting channel 67 of the holder 60 formed in an approximate cylindrical shape. In the process of mounting the position adjusting elastic member 70 in the bow-shaped channel 67 of the holder 60, the ends 79 and 79 of the position adjusting elastic member 70 formed in a bow shape are widened and the position adjusting elastic member 70 is mounted to the mounting channel 67.

When the position adjusting elastic member 70 is mounted on the mounting channel 67, the ends 79 and 79 of the position adjusting elastic member 70 are narrowed by a recovering elastic force generated in the position adjusting elastic member 70 having a spring characteristic and approximately returns to the original bow shape. Thus, it is possible to reliably prevent unintentional falling of the position adjusting elastic member 70 from the mounting channel 67 of the holder 60. In other words, the position adjusting elastic member 70 is reliably fitted to the mounting channel 67 provided on the holder 60.

As shown in FIG. 8, while an inner peripheral surface 77 of the position adjusting elastic member 70 is in contact with the first bottom 67a of the mounting channel 67 provided on the holder 60, the position adjusting elastic member 70 is fitted to the mounting channel 67.

When the holder 60 and the position adjusting elastic member 70 are configured to be mounted in such a state, the position adjusting elastic member 70 is reliably fitted to the mounting channel 67 of the holder 60. Because the position adjusting elastic member 70 is fitted to the mounting channel 67 while the inner peripheral surface 77 contacts the first bottom 67a of the mounting channel 67, the position adjusting elastic member 70 is mounted to the holder 60 while the position adjusting elastic member 70 is in the state to hold the first bottom 67a of the mounting channel 67 provided on the holder 60. Therefore, it is possible to avoid falling of the position adjusting elastic member 70 from the mounting channel 67 of the holder 60 and the position adjusting elastic member 70 is reliably fitted to the mounting channel 67 of the holder 60.

As shown in FIGS. 3, 4, and 8, the position adjusting elastic member 70 is fitted to the mounting channel 67 of the holder 60 in a state in which an outer peripheral surface 73 of the position adjusting elastic member 70 having an approximate bow shape is positioned in the holder 60 inside of the outer peripheral surfaces 63 and 64 of the peripheral wall 61a having an approximate cylindrical shape and which is a part of the holder 60.

When the holder 60 and the position adjusting elastic member 70 are configured so that the holder 60 and the position adjusting elastic member 70 are assembled as described, a situation in which the outer peripheral surface 73 of the position adjusting elastic member 70 is at an outer position than the outer peripheries 63 and 64 of the holder 60 can be avoided. The position adjusting elastic member 70 is fitted to the mounting channel 67 of the holder 60 in this state.

In a structure in which the lens assembly 80 is formed by fitting the position adjusting elastic member 70 to the mounting channel 67 of the holder 60 and the mounting hole 380 (FIGS. 1, 4, and 5) having an approximate cylindrical hole shape is provided on the housing 300 to allow insertion of the lens assembly 80 in a pressed state, the lens assembly 80 must be inserted smoothly into the mounting hole 380 of the housing 300 when the optical pickup device 1 is manufactured by inserting the lens assembly 80 into the mounting hole 380 of the housing 300 or the like.

As shown in FIGS. 3, 4, and 8, when the lens assembly 80 is formed so that the outer periphery 73 of the position adjusting elastic member 70 having an approximate bow shape is positioned at a position further in than the outer peripheries 63 and 64 of the peripheral wall 61a having an approximate cylindrical shape and which is a part of the holder 60 when the position adjusting elastic member 70 is fitted to the mounting channel 67 of the holder 60, it is possible to avoid entanglement of the position adjusting elastic member 70 of the lens assembly 80 on the mounting hole 380 when the lens assembly 80 is inserted and mounted into the mounting hole 380 of the housing 300 (FIGS. 1, 4, and 5). Therefore, the lens assembly 80 is smoothly inserted and mounted in the mounting hole 380 of the housing 300.

As shown in FIGS. 2 and 4, the position adjusting elastic member 70 is mounted to the mounting channel 67 of the holder 60 in a state in contact with or close to a plurality of holding portions 67v provided within the mounting channel 67 of the holder 60.

When the position adjusting elastic member 70 is provisionally fixed to the holder 60, as shown in FIG. 8, an adhesive 9 which solidifies in a short period is applied to sides 78 of the position adjusting elastic member 70 which is formed in an approximate bow shape and to sides 67m of the mounting channel 67 having an approximate bow shape and provided on the holder 60 corresponding to the position adjusting elastic member 70, and the position adjusting elastic member 70 is provisionally fixed within the mounting channel 67 of the holder 60.

The adhesive 9 is applied to both sides 78 of the position adjusting elastic member 70. In addition, the adhesive 9 is applied near each of the holding portions 67v in the bow-shaped mounting channel 67 corresponding to the sides 78 of the position adjusting elastic member 70.

The position adjusting elastic member 70 is reliably provisionally fixed to the mounting channel 67 of the holder 60 using the adhesive 9. Because the adhesive 9 which solidifies in a short period is applied to the sides 78 of the position adjusting elastic member 70 and the sides 67m of the bow-shaped mounting channel 67, it is possible to prevent positional changes of the position adjusting elastic member 70 within the mounting channel 67. Therefore, the position adjusting elastic member 70 is reliably fixed in the mounting channel 67 of the holder 60.

When the position adjusting elastic member 70 is provisionally fixed to the holder 60, an instant adhesive 9 which quickly solidifies is used to provisionally fix the position adjusting elastic member 70 to the holder 60. The instant adhesive 9 is applied to the sides 78 of the position adjusting elastic member 70 and the sides 67m of the mounting channel 67 provided in the holder 60 so that the position adjusting elastic member 70 is provisionally fixed to the holder 60.

The position adjusting elastic member 70 is quickly provisionally fixed to the holder 60 using the instant adhesive 9.

As the instant adhesive, it is possible to use, for example, Aronalpha (registered trademark) 101 and 201 manufactured by Toa Gosei Co., Ltd. This instant adhesive is said to be alpha-cyanoacrylate which instantly polymerizes by chemical reaction with moisture in air.

As shown in FIGS. 4 and 5, a position adjusting portion 75 which can adjust the mounting position of the lens assembly 80 with respect to the housing 300 is provided on the position adjusting elastic member 70 which is a part of the lens assembly 80. In addition, a position controlling portion 375 is provided on the housing 300 corresponding to the position adjusting portion 75 of the position adjusting elastic member 70.

In this manner, the mounting position of the lens assembly 80 having the position adjusting elastic member 70 with respect to the housing 300 is easily adjusted. Because the position adjusting portion 75 is provided on the position adjusting elastic member 70 and the position controlling portion 375 is provided on the housing 300 corresponding to the position adjusting portion 75, the mounting position of the lens assembly 80 with respect to the housing 300 is adjusted by adjusting the position of the position adjusting portion 75 of the position adjusting elastic member 70 (FIGS. 4 and 5) and the position controlling portion 375 of the housing 300 when the lens assembly 80 is assembled to the housing 300 using, for example, a jig 700 shown in FIG. 13.

As shown in FIGS. 1 and 4, the position adjusting portion 75 of the position adjusting elastic member 70 is formed as a position adjusting hole in the form of a through hole provided in the position adjusting elastic member 70. As shown in FIGS. 1, 4, and 5, the position controlling portion 375 of the housing 300 is formed as a position controlling hole in the form of a through hole formed in the housing 300.

When the lens assembly 80 is assembled in the housing 300 (FIG. 4), the position adjusting hole 75 of the position adjusting elastic member 70 which is a part of the lens assembly 80 and the position controlling hole 375 of the housing 300 are matched. In this state, an end 705 of a position adjusting jig element 700 (FIG. 13) is placed through the position adjusting hole 75 of the position adjusting elastic member 70 and the position controlling hole 375 of the housing 300. The mounting position of the lens assembly 80 with respect to the housing 300 (FIG. 4) is adjusted by moving the position adjusting jig element 700.

With such a configuration, the mounting position of the lens assembly 80 with respect to the housing 300 is correctly adjusted.

Alternatively, it is also possible to form the position adjusting portion 75 of the position adjusting elastic member 70 as a position adjusting channel. In addition, it is also possible to use a jig element of another shape (not shown) in place of the jig element 700 shown in FIG. 13.

After the lens assembly 80 is inserted into the mounting hole 380 of the housing 300 (FIGS. 4 and 5), an adhesive (not shown) is applied to the position controlling hole 375 provided in the housing 300 when the lens assembly 80 is fixed to the housing 300. In this manner, the adhesive is supplied to the position adjusting hole 75 provided in the position adjusting elastic member 70 and the mounting channel 67 of the holder 60 and the lens assembly 80 is adhered and fixed to the housing 300. The housing 300 and the lens assembly 80 is reliably fixed by further supplying adhesive (not shown) to the through hole 370 provided opposing the position controlling hole 375 of the housing 300.

The lens assembly 80 is reliably adhered and fixed to the housing 300 using the adhesive. After the mounting position of the lens assembly 80 with respect to the housing 300 is adjusted, an adhesive is applied to the position controlling hole 375 provided in the housing 300 and the through hole 370 opposing the position controlling hole 375. Because adhesion operation of the housing 300 and lens assembly 80 is performed in this manner, the lens assembly 80 is easily adhered and fixed to the housing 300.

When the lens assembly 80 is inserted into the mounting hole 380 of the housing 300 and the lens assembly 80 is fixed to the housing 300, it is preferable to fix the lens assembly 80 to the housing 300 using an ultraviolet curable adhesive which is cured through irradiation with ultraviolet rays.

The lens assembly 80 is easily and quickly fixed to the housing 300 using the ultraviolet curable adhesive. With irradiation of the ultraviolet rays to the ultraviolet curable adhesive, a curing reaction of the ultraviolet curable adhesive is accelerated and the lens assembly 80 is quickly adhered to the housing 300. In addition, the lens assembly 80 is adhered and fixed to the housing 300 with high precision.

The holder 60 (FIG. 1) is formed using a resin material. More specifically, a thermoplastic synthetic resin material which can be formed through injection molding is used to form the holder 60. The position adjusting elastic member 70 mounted to the holder 60 is formed using a metal material having a spring characteristic.

Because a metal material is used to form the position adjusting elastic member 70 to be mounted to the resin holder 60, even when the adjusting operation of the position of the lens assembly 80 with respect to the housing 300 (FIGS. 4 and 5) is repeatedly performed, the lens assembly 80 having the holder 60 and the position adjusting elastic member 70 is assembled to the housing 300 with a high precision.

For example, when a position adjusting operation of the lens assembly 80 having the holder 60 in which the holder 60 and the position adjusting member 70 are integrated and the holder 60 having a position adjusting portion 75 is formed using a synthetic resin material with respect to the housing 300 is repeatedly performed, there has been a concern that an optimum position adjusting operation cannot be performed. For example, when the end 705 of the position adjusting jig element 700 (FIG. 13) is repeatedly brought into contact with the position adjusting portion 75 of the resin holder 60, there is a concern that the position adjusting portion 75 of the resin holder 60 (FIGS. 4 and 5) will be trimmed and an optimum position adjusting operation of the lens assembly 80 with respect to the housing 300 cannot be performed.

The resin material generally has superior sliding characteristics compared to the metal material and is advantageous in reducing the cost of the molded structures such as the holder 60. The metal material, on the other hand, is generally more wear resistant compared to a resin material. When the holder 60 is formed using a resin material and the position adjusting elastic member 70 is formed using a metal material, even when, for example, the position adjusting operation of the lens assembly 80 with respect to the housing 300 (FIGS. 4 and 5) using the position adjusting jig element 700 (FIG. 13) is repeatedly performed, it is possible to prevent trimming of the position adjusting portion 75 of the metal position adjusting elastic member 70. Therefore, it is possible to repeatedly perform the position adjusting operation of the lens assembly 80 with respect to the housing 300.

Because a resin material is used for the holder 60 which is a part of the lens assembly 80, the sliding characteristic of the protrusions 65 and 66 provided on the outer peripheries 63 and 64 of the holder 60 with respect to the inner periphery 385 of the mounting hole 380 of the metal housing 300 is improved. Therefore, it is possible to facilitate a fine adjustment operation of the mounting position of the lens assembly 80 with respect to the housing 300.

The holder 60 is preferably formed using a thermoplastic synthetic resin material which can be formed through injection molding. Through the injection molding, it is possible to effectively mass-produce the holder 60. As the thermoplastic synthetic resin which can be formed through injection molding, it is possible to use, for example, polyarylene sulfide-based resin such as poly phenylene sulfide which is superior in thermal stability, electrical characteristic such as insulating characteristic, mechanical characteristic, and size stability. The poly phenylene sulfide is abbreviated in this description as "PPS". An example of a structure which is based on the poly phenylene sulfide resin is, for example, DIC•PPS_glass fiber-strengthened thermal endurance type (bridging type)

FZ-1130-D5 manufactured by Dainippon Ink and Chemicals Incorporated. It is also possible to use a holder 60 in which other resin materials are used.

The position adjusting elastic member 70 is preferably formed using stainless steel. As the stainless steel, it is possible to use, for example, SUS301. The housing 300 is preferably formed using a light alloy material which contains magnesium (Mg). It is also possible to form the housing 300 using a synthetic resin material.

The lens 50 is formed as a divergent lens 50 which collects the laser light emitted from the LD 20.

By having the structure as shown in FIGS. 1-4, the lens assembly 80 having the divergent lens 50 can be assembled in the housing 300 with a high precision. The divergent lens 50 has a function to collect laser light emitted from the LD 20 and is an important optical component of the optical pickup device 1.

For example, when the mounting position of the divergent lens 50 is deviated with respect to the housing 300, the setting of the optical path (FIG. 12) in the optical pickup device 1 is deviated, and there is a concern that malfunction may occur in the optical pickup device 1 caused by the deviation. However, when the lens assembly 80 having the divergent lens 50 (FIGS. 1-5) is precisely assembled in the housing 300, an optical pickup device in which the optical path is precisely adjusted is provided to a manufacturer of the optical disk device or to a manufacturer of the optical pickup device 1.

A manufacturing method of the optical pickup device 1 will now be described.

The position adjusting elastic member 70 (FIGS. 1-3 and 6-8) which allows the holder 60 to move is mounted to the holder 60. The position adjusting elastic member 70 is provisionally fixed to the holder 60 through adhesion using the instant adhesive 9 (FIG. 8). The position adjusting elastic member 70 is mounted to the mounting channel 67 of the holder 60 (FIGS. 6-8) and the instant adhesive 9 (FIG. 8) is applied to the sides 78 of the position adjusting elastic member 70 and the sides 67m of the bow-shaped mounting channel 67 provided on the holder 60 so that the position adjusting elastic member 70 is provisionally fixed to the holder 60.

The divergent lens 50 through which laser light transmits, which is substantially clear and transparent, and made of the synthetic resin (FIGS. 1-3 and 11), is mounted to the holder 60. The divergent lens 50 is adhered and fixed to the holder 60 using the ultraviolet curable adhesive 8 (FIGS. 9 and 10). The ultraviolet curable adhesive 8 (FIGS. 9 and 10) is supplied to the cutaway portion 61d of the holder 60 (FIGS. 2 and 3) to which the lens 50 is mounted. The adhesive 8 is cured by irradiating the ultraviolet rays to the adhesive 8 in this state to adhere and fix the cutaway portion 61d of the holder 60 (FIGS. 2 and 3) and the periphery 58 of the lens 50. The lens assembly 80 (FIGS. 4 and 5) is formed in this manner.

The lens assembly 80 formed in this manner is assembled to the housing 300. In this operation, the mounting position of the lens assembly 80 can be adjusted with respect to the housing 300 (FIGS. 4 and 5) using the position adjusting jig element 700 (FIG. 13).

With this process, the lens assembly 80 can be easily assembled in the housing 300 with a high precision. Because the mounting position of the lens assembly 80 with respect to the optical components of the housing 300 is adjusted using the position adjusting jig element 700 when the lens assembly 80 having the divergent lens 50 is mounted to the housing 300, it is possible to assemble the lens assembly 80 to the housing 300 with a high precision. In other words, it is possible to precisely adjust the optical path through the optical components mounted on the housing 300. That is, it is possible to precisely set the optical path in the optical pickup device 1 when the optical pickup device 1 is manufactured.

The position adjusting jig element 700 shown in FIGS. 13A and 13B comprises a small-diameter first pin 710 (FIG. 13) which contacts the lens assembly 80 (FIG. 4) and has an approximate circular column shape, a large-diameter second pin 720 which extends from the first pin 710, has a larger diameter 726 than the diameter 716 of the first pin 710, and has an approximate circular column shape, and a jig body 730 which extends from the second pin 720, has a diameter 736 which is larger than the diameter 726 of the second pin 720, and has an approximate circular column shape.

The end 705 of the position adjusting jig element 700 comprises the small-diameter first pin 710 and the large-diameter second pin 720. The small-diameter first pin 710 is formed as a decentered pin protruding from the large-diameter second pin 720 in a state of being decentered from a center line of the position adjusting jig element 700 along the longitudinal direction.

The center line of the first pin 710 having an approximate circular column shape is decentered from a center line of the second pin 720 having an approximate circular column shape and a center line of the jig body 730 having an approximate circular column shape. The center line of the first pin 710 protrudes decentered from the second pin 720.

The position adjusting hole 75 is provided on the position adjusting elastic member 70 (FIGS. 1 and 4) corresponding to the end 705 of the position adjusting jig element 700. The position controlling hole 375 is provided in the housing 300 (FIGS. 4 and 5) corresponding to the end 705 of the position adjusting jig element 700 (FIG. 13).

The position adjusting hole 75 of the position adjusting elastic member 70 of the lens assembly 80 (FIGS. 4 and 5) is matched with the position controlling hole 375 of the housing 300 (FIGS. 4 and 5) when the lens assembly 80 is inserted into the mounting hole 380 of the housing 300 through an opening 340 formed in the housing body 301 and having an approximate quadrangular shape to assemble the lens assembly 80 in the housing 300.

The end 705 of the position adjusting jig element 700 (FIG. 13) is inserted into the position adjusting hole 75 and the position controlling hole 375.

By matching the second pin 720 of the position adjusting jig element 700 (FIG. 13) to the position controlling hole 375, the first pin 710 of the position adjusting jig element 700 (FIG. 13) is matched to the position adjusting hole 75.

The jig body 730 of the position adjusting jig element 700 is rotated and the second pin 720 of the position adjusting jig element 700 is rotated in an approximate arc shape so that the position adjusting elastic member 70 of the lens assembly 80 (FIGS. 4 and 5) is pushed and moved along an optical axis direction L of the laser light by the first pin 710 of the position adjusting jig element 700, to adjust the mounting position of the lens assembly 80 with respect to the housing 300.

More specifically, by rotating the jig body 730 of the position adjusting jig element 700 (FIG. 13) and rotating the second pin 720 of the position adjusting jig element 700 in an approximate arc shape, the position adjusting elastic member 70 of the lens assembly 80 (FIGS. 4 and 5) is pushed and moved along the Z-axis direction of the optical pickup device 1 (FIG. 5) by the first pin 710 of the position adjusting jig element 700, to adjust the mounting position of the lens assembly 80 with respect to the housing 300.

In this manner, it is possible to easily and precisely perform the operation to adjust the mounting position of the lens assembly 80 with respect to the housing 300 when the lens assembly 80 is assembled in the housing 300.

A circular hole 376 (FIGS. 4 and 5) corresponding to the diameter 726 of the second pin 720 (FIG. 13) having an approximate circular column shape is formed in the position controlling hole 375 provided in the housing 300 (FIGS. 4 and 5) and the position controlling hole 375 comprises a sheet-shaped stopper portion 377 which stops insertion of the second pin 720 (FIG. 13) of the position adjusting jig element 700 within the circular hole 376 of the housing 300 and the arc-shaped rotation of the first pin 710 of the position adjusting jig element 700. The sheet-shaped stopper portion 377 (FIGS. 4 and 5) is provided within the circular hole 376 of the housing 300. The position adjusting hole 75 provided in the position adjusting elastic member 70 (FIGS. 1 and 4) is formed in an elliptical shape. The position adjusting hole 75 comprises a small-diameter portion 76n (FIGS. 1 and 4) corresponding to the diameter 716 of the first pin 710 (FIG. 13) having a circular column shape and a large-diameter portion 76m (FIGS. 1 and 4) corresponding to the first pin 710 which is decentered from the second pin 720 (FIG. 13).

The body 730 of the position adjusting jig element 700 (FIG. 13) is rotated and the second pin 720 having an approximate circular column shape is rotated in an approximate arc shape during the process of fine adjustment of the mounting position of the lens assembly 80 with respect to the housing 300 (FIGS. 4 and 5). In this manner, the first pin 710 (FIG. 13) having an approximate circular column shape is rotated from an end (first end) 378 of the stopper portion 377 (FIG. 4) to another end (second end) 379 in an approximate arc shape. In addition, when the second pin 720 is rotated in an approximate arc shape, the first pin 710 (FIG. 13) is rotated from the second end 379 of the stopper portion 377 (FIG. 4) to the first end 378 of the stopper portion 377 in an approximate arc shape.

During this process, the first pin 710 pushes and moves a side (first side) 76p or another side (second side) 76q of the small-diameter portion 76n of the position adjusting elastic member 70 (FIGS. 1 and 4). With this process, the first pin 710 of the position adjusting jig element 700 (FIG. 13) moves along the major axis direction of the elliptical position adjusting hole 75 provided in the position adjusting elastic member 70 (FIGS. 1 and 4).

In this manner, the lens assembly 80 is assembled to the housing 300 to more easily and precisely perform the operation to adjust the mounting position of the lens assembly 80 with respect to the housing 300.

Because a stopper portion 377 for stopping insertion of the second pin 720 of the position adjusting jig element 700 is provided in the position controlling circular hole 376 provided in the housing 300, the end 705 of the position adjusting jig element 700 is inserted into the circular hole 376 of the housing 300 while being positioned at a suitable position with respect to the housing 300.

The focus of the laser light in the FMD 240 (FIG. 12) is adjusted by finely adjusting the mounting position of the lens assembly 80 along the Z-axis direction (FIG. 5) of the optical pickup device 1 with respect to the housing 300 (FIGS. 4 and 5). The focus of the laser light is determined based on, for example, jitter measured by an optical measurement device (not shown) or the like. The term "jitter" refers to slight vibration and distortion.

In this manner, the adjustment of the lens 50 in the optical pickup device 1 which is commonly referred to as "defocus adjustment" is performed. In this description, the term "defocus adjustment" refers to an adjustment operation of focusing from a state of non-focus.

After the mounting position of the lens assembly 80 with respect to the housing 300 (FIGS. 4 and 5) is finely adjusted, the lens assembly 80 is adhered and fixed to the housing 300 using the ultraviolet curable adhesive.

The lens assembly 80 is inserted into the mounting hole 380 formed in the housing 300, the position controlling hole 375 of the housing 300 and the position adjusting hole 75 of the position adjusting elastic member 70 which is a part of the lens assembly 80 are matched, and ultraviolet curable adhesive is supplied to the position controlling hole 375 so that the ultraviolet curable adhesive is supplied to the position adjusting hole 75 and the mounting channel 67 of the holder 60. In addition, the ultraviolet curable adhesive is further supplied also to the through hole 370 provided opposing the position controlling hole 375. In this state, ultraviolet rays are irradiated to the ultraviolet curable adhesive to cure the ultraviolet curable adhesive and adhere and fix the lens assembly 80 to the housing 300. In this manner, it is possible to assemble the lens assembly 80 to the housing 300 with a high precision with respect to the optical components equipped in the housing 300.

Then, the LD holder 30 having the LD 20 (FIG. 5) and the ½ wave retardation plate-plus-diffraction grating 40 is assembled to a holder mounting portion 330 of the housing 300. Various components are equipped to the housing body 301 and the optical pickup device 1 is manufactured.

In addition, a second guide axis (not shown) which is a part of the optical disk device (not shown) is matched to the second guide 312 of the housing 300 and a first guide axis (not shown) which is a part of the optical disk (not shown) is matched to the first guide 311 of the housing 300. The housing 300 is moved along the Z-axis direction of the optical pickup device 1 while being supported by the first guide axis and the second guide axis.

The optical disk device (not shown) having the optical pickup device 1 can be equipped in a PC (personal computer) such as a notebook PC and desktop PC or an acoustic device such as a CD player and a DVD player.

The optical pickup device of the present invention is not limited to those shown in the drawings. Various modifications can be made within the scope of the present invention.

What is claimed is:

1. An optical pickup device comprising:
   a lens through which light transmits;
   a holder to which the lens is mounted;
   a position adjusting member which is mounted on the holder; and
   a housing to which the holder is mounted, wherein
   a lens assembly is formed by mounting the lens and the position adjusting member on the holder;
   the holder is formed in an approximate cylindrical shape;
   a mounting hole through which the lens assembly can be inserted is provided in the housing;
   a protrusion which contacts an inner periphery of the mounting hole is provided on an outer periphery of the holder;
   the protrusion is formed in an approximate triangle shape when the holder is viewed from a side from which the holder can be seen as a ring;
   a base portion of the protrusion corresponding to a base of the triangle is provided on the outer periphery of the holder;
   the housing has a structure which allows adjustment of a mounting position of the lens assembly when the lens assembly is assembled to the housing; and a tip portion of the protrusion corresponding to a vertex of the triangle is in contact with the inner periphery of the mounting hole having an approximate circular shape.

2. An optical pickup device comprising:

a lens through which light transmits;

a holder to which the lens is mounted;

a position adjusting member which is mounted on the holder; and a housing to which the holder is mounted, wherein a lens assembly is formed by mounting the lens and the position adjusting member on the holder;

a mounting hole having an approximate circular shape and through which the lens assembly can be inserted is provided in the housing;

the position adjusting member is formed in a bow shape;

the holder is formed in an approximate cylindrical shape and has a channel corresponding to the position adjusting member, the housing has a structure which allows adjustment of a mounting position of the lens assembly when the lens assembly is assembled to the housing;

when the position adjusting member is mounted to the channel of the holder, ends of the position adjusting member are widened and the position adjusting member is mounted to the channel; and the ends of the position adjusting member are narrowed by a recovering elastic force generated in the position adjusting member after the position adjusting member is mounted to the channel so that the position adjusting member is fitted to the channel.

3. An optical pickup device according to Claim 2, wherein the position adjusting member is fitted to the channel while the inner periphery of the position adjusting member contacts a bottom surface of the channel.

4. An optical pickup device according to Claim 2, wherein the position adjusting member is fitted to the channel while in a state in which the outer periphery of the position adjusting member is positioned at a position further in than the outer periphery of the holder.

5. An optical pickup device according to Claim 2, wherein the position adjusting member is fixed within the channel by an adhesive applied to sides of the position adjusting member and sides of the channel.

6. An optical pickup device according to Claim 2, wherein a mounting hole through which the lens assembly can be inserted is provided in the housing, the holder is formed in an approximate cylindrical shape, a protrusion which contacts an inner periphery of the mounting hole is provided on an outer periphery of the holder, the protrusion is formed in an approximate triangle shape when the holder is viewed from a side from which the holder can be seen as a ring, a base portion of the protrusion corresponding to a base of the triangle is provided on the outer periphery of the holder, and a tip portion of the protrusion corresponding to a vertex of the triangle is in contact with the inner periphery of the mounting hole having an approximate circular shape.

* * * * *